(12) United States Patent
Kikuchi et al.

(10) Patent No.: US 7,669,884 B2
(45) Date of Patent: Mar. 2, 2010

(54) AIR BAG DEVICE

(75) Inventors: Yuji Kikuchi, Saitama (JP); Yutaka Okamoto, Saitama (JP); Kazutada Sasaki, Saitama (JP); Tadanori Masuda, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 286 days.

(21) Appl. No.: 11/789,579

(22) Filed: Apr. 25, 2007

(65) Prior Publication Data

US 2007/0262569 A1 Nov. 15, 2007

(30) Foreign Application Priority Data

May 9, 2006 (JP) .............................. 2006-130061
Oct. 2, 2006 (JP) .............................. 2006-270604

(51) Int. Cl.
*B60R 21/34* (2006.01)
*B60R 21/215* (2006.01)

(52) U.S. Cl. .................... 280/728.3; 180/271; 180/274; 280/728.2; 280/730.1; 280/734

(58) Field of Classification Search ............. 280/728.3, 280/730.1, 732, 728.2, 734, 743.2; 180/271, 180/274
See application file for complete search history.

(56) References Cited

U.S. PATENT DOCUMENTS

| | | | |
|---|---|---|---|
| 5,447,327 A | | 9/1995 | Jarboe et al. |
| 6,565,115 B2 * | | 5/2003 | Streck ...................... 280/728.3 |
| 6,568,705 B2 * | | 5/2003 | Kinane ..................... 280/728.3 |
| 6,623,029 B2 * | | 9/2003 | Sun et al. ................. 280/728.2 |
| 7,140,636 B2 * | | 11/2006 | DePue et al. ............... 280/732 |
| 7,210,700 B2 * | | 5/2007 | Zagrodnicki et al. ...... 280/728.3 |
| 7,267,360 B2 * | | 9/2007 | Geum ..................... 280/728.2 |
| 7,370,879 B2 * | | 5/2008 | Hotta et al. .............. 280/728.2 |
| 2003/0080540 A1 | | 5/2003 | Kinane |
| 2003/0184058 A1 | | 10/2003 | Gray et al. |
| 2004/0026902 A1 * | | 2/2004 | Yasuda et al. ............ 280/728.2 |
| 2004/0056455 A1 * | | 3/2004 | Nishijima et al. ........ 280/728.3 |
| 2007/0080521 A1 * | | 4/2007 | Leserre et al. ........... 280/728.3 |

FOREIGN PATENT DOCUMENTS

| | | |
|---|---|---|
| DE | 19633109 | 2/1997 |
| DE | 19618817 | 11/1997 |
| DE | 19645866 | 5/1998 |

(Continued)

*Primary Examiner*—Ruth Ilan
*Assistant Examiner*—James English
(74) *Attorney, Agent, or Firm*—Carrier, Blackman & Associates, P.C.; Joseph P. Carrier; William D. Blackman

(57) ABSTRACT

An air bag device includes a retainer having an opening, a lid for covering the opening of the retainer, an air bag accommodated in the retainer, at least one hinge member connecting the retainer and the lid, and at least one guide plate having a hook-shaped or J-shaped cross section to define a recess. The hinge member is bent at its mid portion along the recess of the guide plate, and one end portion of the hinge member is fixed to a reverse surface of the lid at one side thereof and the other end portion of the hinge member is fixed to the guide plate and sandwiched between the guide plate and the retainer.

13 Claims, 22 Drawing Sheets

FOREIGN PATENT DOCUMENTS

| | | |
|---|---|---|
| DE | 19808910 | 9/1999 |
| DE | 19910332 | 9/2000 |
| DE | 10151715 | 5/2003 |
| DE | 10249824 | 5/2003 |
| DE | 10244311 | 4/2004 |
| EP | 1034988 | 9/2000 |
| JP | 11-291856 | 10/1999 |
| JP | 2003-341458 A | 12/2003 |
| JP | 2004-058965 | 2/2004 |

\* cited by examiner

AIR BAG DEVICE

CROSS REFERENCE TO RELATED APPLICATIONS

This application claims the foreign priority benefit under Title 35, United States Code, §119(a)-(d) of Japanese Patent Applications No. 2006-130061 filed on May 9, 2006, and No. 2006-270604 filed on Oct. 2, 2006 in the Japan Patent Office, the disclosures of which are herein incorporated by reference in their entirety.

BACKGROUND OF THE INVENTION

The present invention relates to an air bag device which can relieve an impact force applied to a collision object upon collision of the collision object, such as a pedestrian, with a vehicle.

As a conventional air bag device, for example, Japanese Laid-open Patent Application No. 2004-58965 (paragraphs [0013] to [0019]; FIG. 1) discloses a lid-hinge structure which employs a hinge mechanism positioned between a lid and a retainer of an air bag module for accommodating an air bag. In this lid-hinge structure, hinges having a U-shaped cross section are attached to lid connecting parts of the retainer where the lid is releasably fixed to the retainer through the hinges.

When the air bag module operates, inflators inflate the air bag so that the air bag lifts up the lid while stretching out and deforming the U-shaped hinges positioned in the lid connecting parts. Connecting parts of the lid are then rotated to open the lid. Since each U-shaped hinge undergoes a stretched deformation, the rotation locus of the connecting part of the lid increases, so that the lid is less likely to interfere with other peripheral parts of the air bag module.

However, according to the air bag device disclosed in Japanese Laid-open Patent Application No. 2004-58965, since the retainer accommodates the air bag which extends in the lateral directions to cover the front windshield, the strength of the retainer becomes weak at the front and rear sides. Therefore, when the air bag inflates, the (upper) opening of the retainer is stretched out and deformed, which causes the hinges fixed to the retainer to be displaced outward together with the retainer and changes the rotation locus of the lid. For this reason, as seen in the section, even if the rotation locus (circumference) of the lid is increased at the connecting part by the stretched deformation of the U-shaped hinge, the lid may interfere with the vehicular peripheral parts if the connecting parts of the lid displace downward by the deformation of the opening of the retainer.

Further, it is necessary to reliably deform the hinges to control the rotation locus of the lid by means of the U-shaped hinges, etc. Depending on the strength and shape of the hinge, when the air bag inflates and lifts up the lid surface to open the lid, the hinges may not be deformed while the lid is opened. This disadvantageously changes the expansion direction of the air bag because of the non-deformed hinges. Accordingly, it is necessary to carefully study the sectional shape and the thickness of the hinge in advance.

Generally, the lid is made of a resin material. Material properties of the resin material are highly dependent on temperature, and the strength of the resin material becomes weak at low temperatures. If the air bag module operates when the outside air temperature is low, the expansion force of the air bag deforms the lid surface, so that the lid may be broken off and scattered out.

In view of the above, the present invention seeks to provide an air bag device which can open the lid without interfering with other vehicular parts when the air bag inflates and lifts up the lid.

SUMMARY OF THE INVENTION

According to the present invention, there is provided an air bag device comprising: a retainer having an opening; a lid for covering the opening of the retainer; an air bag accommodated in the retainer; at least one hinge member connecting the retainer and the lid; and at least one guide plate having a hook-shaped or J-shaped cross section to define a recess. The hinge member is bent at its mid portion along the recess of the guide plate. One end portion of the hinge member is fixed to a reverse surface of the lid at one side thereof and the other end portion of the hinge member is fixed to the guide plate and sandwiched between the guide plate and the retainer.

In the aforementioned air bag device, one end portion of the guide plate may extend to a lower portion of the retainer along and over the hinge member. Further, a reinforcement plate may be fixed to the reverse surface of the lid.

According to the aforementioned air bag device, an inflator may be arranged behind the retainer.

With this arrangement of the air bag device, when the inflator positioned behind the retainer detonates explosive to feed air (gas) to the air bag, the air bag inflates and expands toward the opening of the retainer. While the air bag lifts up the lid, the hinge is stretched out in a direction away from the opening of the retainer and then comes into contact with the distal end of the guide plate. When the lid is lifted up further by the air bag, the hinge rotates around the distal end of the guide plate while lifting up the lid, so that the retainer is open without an interference of the lid with vehicular parts such as a hood.

Further, since the inflator is arranged behind the retainer, the height of the retainer can be decreased as compared with the case in which the inflator is arranged beneath the retainer. Therefore, the volume of the retainer is decreased, so that when the air bag inflates within the retainer, a load exerted by the air bag to expand side surfaces of the retainer can be decreased, thereby decreasing the deformation amount at the opening of the retainer. This further enables to prevent interference of the lid with the vehicular parts such as the hood. Furthermore, since the height of the retainer is short, it is possible to provide a space beneath the retainer. It is also possible to increase the height of the retainer to accommodate therein a large-volume air bag.

The aforementioned air bag device may further comprise an inflator cover which defines a space in communication with an opening formed in a rear surface of the retainer and extending rearward of a vehicle on which the air bag device is mounted.

With this arrangement of the air bag device, the inflator cover for accommodating the inflator can be formed as a discrete member from the retainer, and since the inflator cover is arranged at the rear of the retainer, the volume of the retainer and therefore the weight of the retainer can be decreased as compared with the case in which the inflator is arranged inside the retainer.

Other features and advantages of the present invention will be apparent from the following detailed description with reference to the accompanying drawings.

BRIEF DESCRIPTION OF THE DRAWINGS

The aspects of the present invention will become more apparent by describing in detail illustrative, non-limiting embodiment thereof with reference to the accompanying drawings, in which:

FIGS. 17A and 17B illustrate Modification 5 of the air bag device according to the third embodiment, in which FIG. 17A is an exploded perspective view and FIG. 17B is a sectional view of the air bag device;

DESCRIPTION OF THE PREFERRED EMBODIMENTS

Preferred embodiments of the present invention will be described with reference to the accompanying drawings. Although an air bag device is explained as an air bag device mounted on a vehicle and for protecting a pedestrian, etc. colliding with the vehicle throughout the embodiments and modifications, the air bag device may be adapted to other types of air bag devices, such as an air bag device provided at the instrument panel for protecting a passenger seated in the passenger seat, a side air bag device, and a curtain air bag device.

First Embodiment

Figure 1:
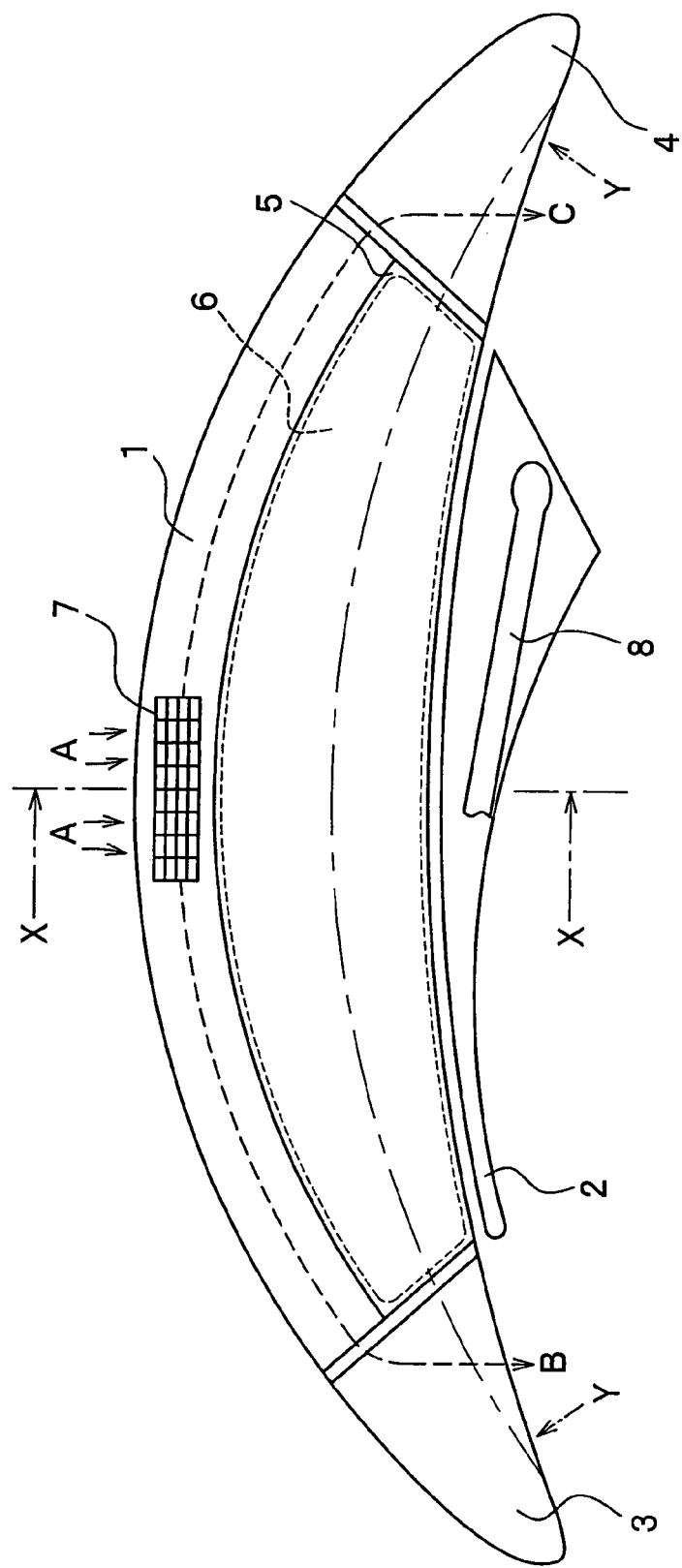
FIG. 1 is a top plan view illustrating a mounting position of an air bag device according to a first embodiment of the present invention as viewed from top of a vehicle.

As seen in FIG. 1, an air bag device 6 is installed beneath a lid 5 within a space surrounded by a front cowl top 1, a rear cowl top 2, a left cowl top 3, and a right cowl top 4. A ventilation hole 7 is provided in the front cowl top. Air is taken in from the front side of the vehicle through the ventilation hole 7 as shown by the arrow A, and then flows from the front cowl top 1 toward the left cowl top 3 and the right cowl top 4 as shown by the arrows B and C. The air from the ventilation hole 7 is used for the air bag device 6 as well as used for the air-conditioning system (not shown). Wipers 8 are attached to the rear cowl top 2.

Figure 2:
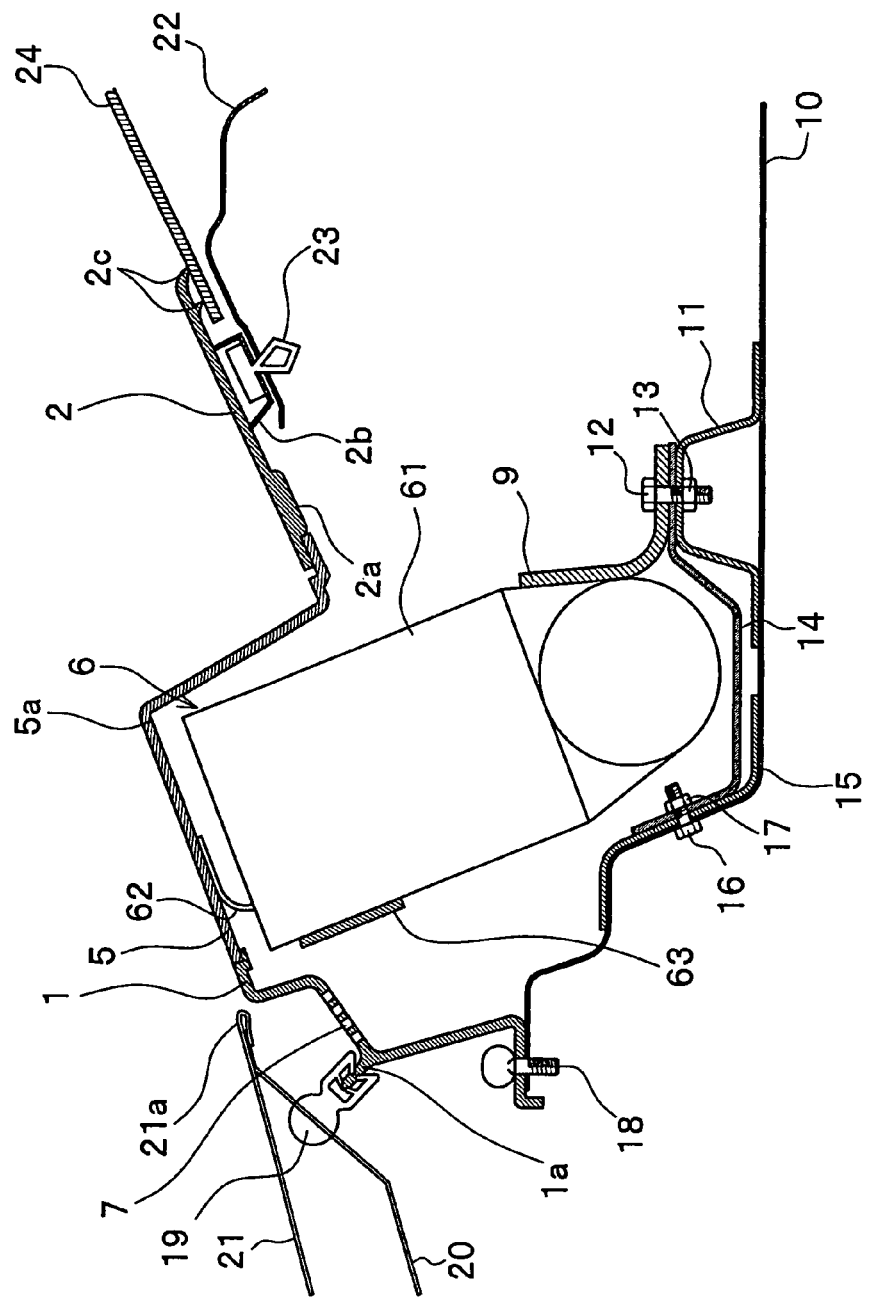
FIG. 2 is a sectional view of the air bag device taken along the line X-X of FIG. 1.

As seen in FIG. 2, the air bag device 6 positioned beneath the lid 5 is fixed to the vehicle through brackets 9 (only one bracket is shown in section) which are secured by welding, etc. to the outer surface of the retainer 61 as a casing. The brackets 9 are secured to mounting tables 11 by bolts 12 and nuts 13. The mounting tables 11 are fixed by welding, etc. to a dashboard upper 10 which extends beneath the air bag device 6. As seen in the sectional view of FIG. 2, a connecting member 14 is sandwiched between the bracket 9 and the mounting table 11. The connecting member 14 is further secured to a fixing member 15 which is fixed to the dashboard upper 10 by bolts 16 and nuts 17. The air bag device 6 is therefore positioned in a predetermined position relative to the dashboard upper 10.

Figure 3:
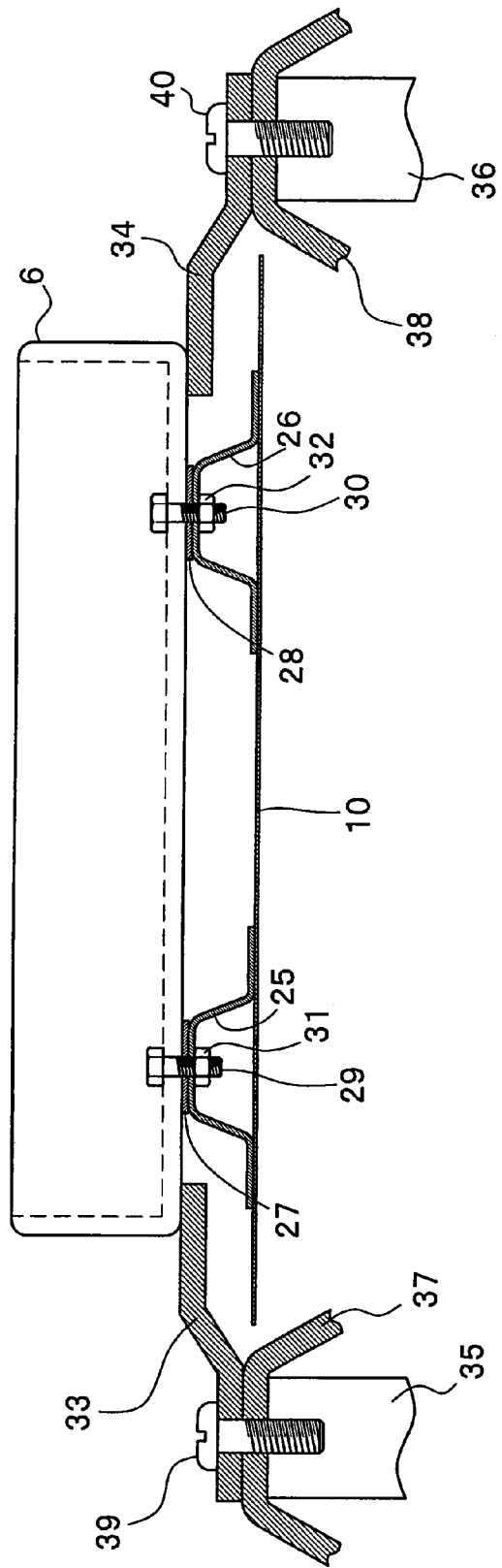
FIG. 3 is a sectional view of the air bag device taken along the line Y-Y of FIG. 1.

The front cowl top 1 is joined to the front end of the dashboard upper 10 by screw clips 18. Clips 19 are attached to projections 1a of the front cowl top 1 so that a hood supporting member 20 for supporting a hood 21 is secured to the front cowl top 1 through the clips 19. The rear end 21a of the hood 21 is positioned above the ventilation hole 7. The rear end of the front cowl top 1 is joined to the front end of the lid 5. Although in this preferred embodiment the lid 5 overlaps the front cowl top 1, this joint structure is not limited to this specific structure and other structures may be employed as long as the lid 5 is readily separated from the front cowl top 1 upon inflation of an air bag 64 (FIG. 3). As an example, the lid 5 and the front cowl top 1 are joined together by adhesive with lower adhesive strength.

As seen in FIG. 2, the lid 5 is substantially L-shaped in cross section. A part of the lid 5 defines a slit 5a. The slit 5a breaks off to open the upper part of the air bag device 6 when the air bag device 5 inflates the air bag 64 and lifts up the lid 5. At the rear end of the lid 5 is arranged the rear cowl top 2 which is positioned by a stepped portion 2a. Securing members 2b are formed on the reverse surface of the rear cowl top 2. The securing members 2b are joined to a windshield floor 22 through clips 23. Further, hold-down portions 2c are formed at the rear end of the rear cowl top 2. The hold-down portions 2c hold the front end side of the front windshield 24 which is positioned between the rear cowl top 2 and the windshield floor 22.

The retainer 61 of the air bag device 6 is made of steel, etc. The lid 5 is made of a resin material. The bracket 9 is made of steel, etc. To connect the lid 5 and the retainer 61, hinge members 62 are welded to the lid 5. The hinge members 62 and guide plates 63 are joined to the retainer 61 by rivets, etc. The retainer 61 and the brackets 9 are welded together. Details of the hinge member 62 and the guide plate 63 will be described later. As long as a smooth releasing operation of the lid 5, the number of hinge members 62 may not be limited and the lid 5 may be connected only by one hinge member 62. Also, the lid 5 may be divided into a plurality of divided lids, each of which is connected to the retainer 61 through at least one hinge member 62.

As seen in FIG. 3, the bottom surface of the air bag device 6 is fixed to mounting tables 25, 26 secured to the dashboard upper 10 by bolts 29, 30 and nuts 31, 32 through washers 27, 28. Further, connecting members 33, 34 are joined to the bottom fringe portions of the air bag device 6 by welding, etc. These connecting members 33, 34 are further connected to the vehicular parts (not shown) through suspension dampers 35, 36 and damper housings 37, 38 by bolts 39, 40.

Figure 4:
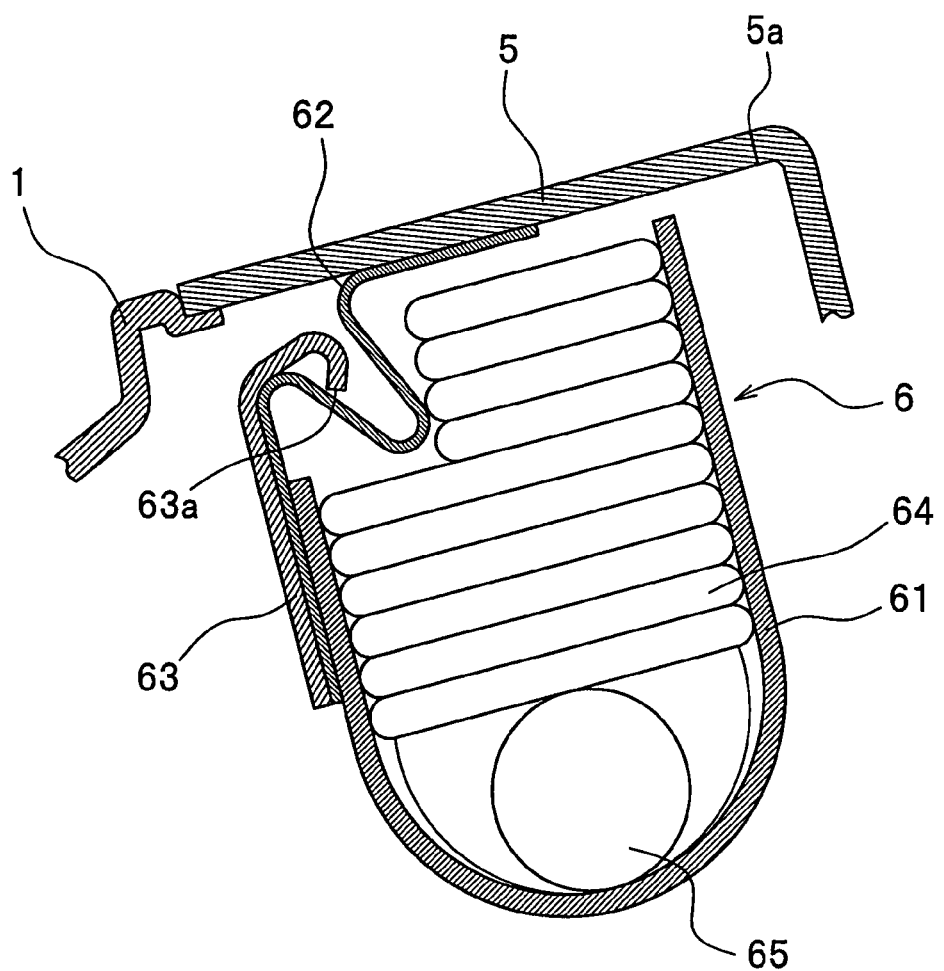
FIG. 4 is a sectional view illustrating main parts of the air bag device according to the first embodiment.

As shown in FIG. 4, the air bag device 6 mainly includes the retainer 61 having an opening at its upper end as seen from the front of the figure, the lid 5 for covering the opening of the retainer 61, at least one hinge member 62 connecting the retainer 61 and the lid 5, at least one guide plate 63 having a hook-shaped or J-shaped cross section to define a recess, the air bag 64 accommodated in the retainer 61, and at least one inflator 65 for feeding air (gas) into the air bag 64.

The hinge member 62 is substantially W-shaped in cross section. One end portion of the hinge member 62 is fixed to the reverse surface of the lid 5 at one side thereof and the other end portion of the hinge member 62 is fixed to the outer surface of the retainer 61. The hinge member 62 is bent at the mid portion to provide a protruding portion. The hinge member 62 is arranged such that the protruding portion thereof is directed to the inside of the retainer 61 while the opposite dent portion thereof is directed to the external of the retainer 61 that is the upward direction of FIG. 4.

The guide plate 63 is secured to the retainer 61 such that the distal end 63a of the hook head portion is positioned in the dent portion of the hinge member 62 and the hook body portion is fixed to the hinge member 62 which is welded to the retainer 61. The guide plate 63 is made from a metal plate such as of steel. The hinge member 62 and the retainer 61 are also made of metal such as steel.

Figure 5:
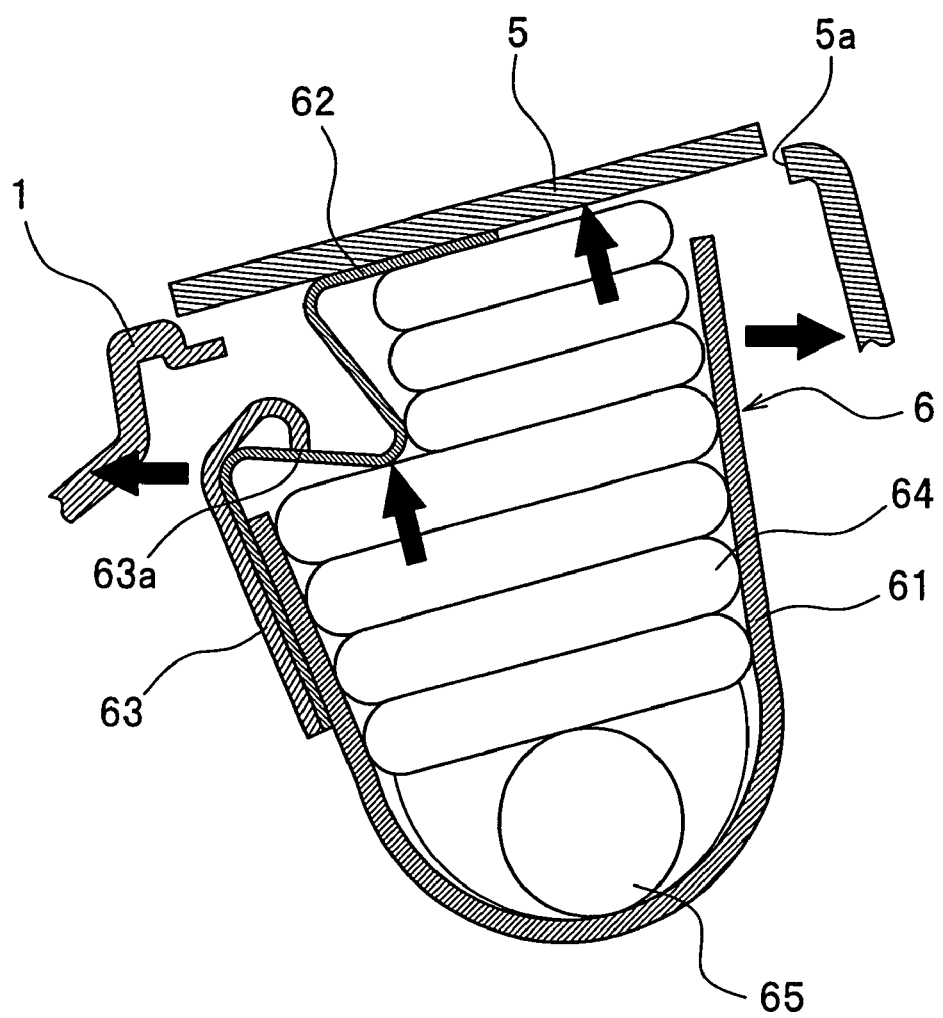
FIG. 5 explains the operation of the air bag device according to the first embodiment.
Figure 6:
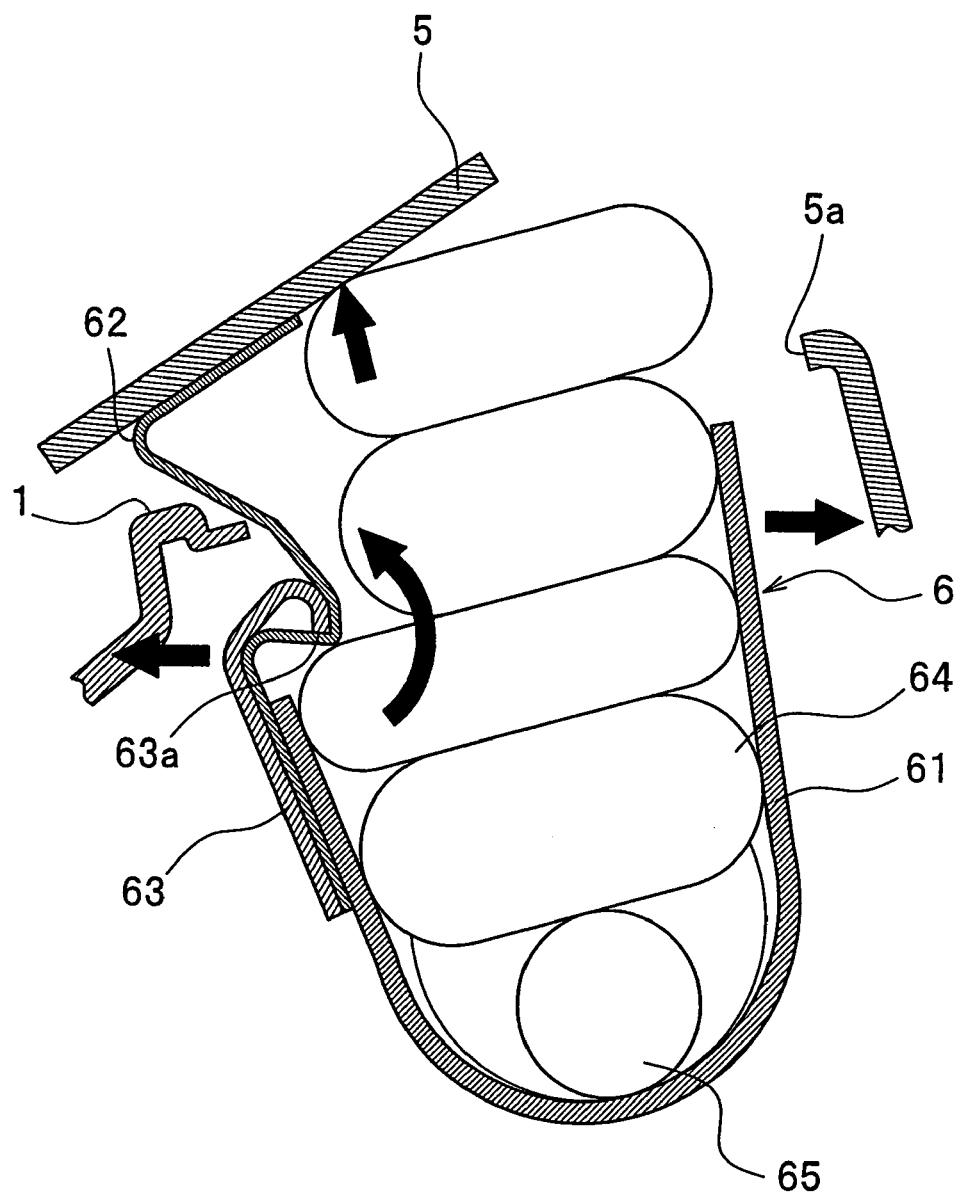
FIG. 6 explains the operation of the air bag device according to the first embodiment.
Figure 7:
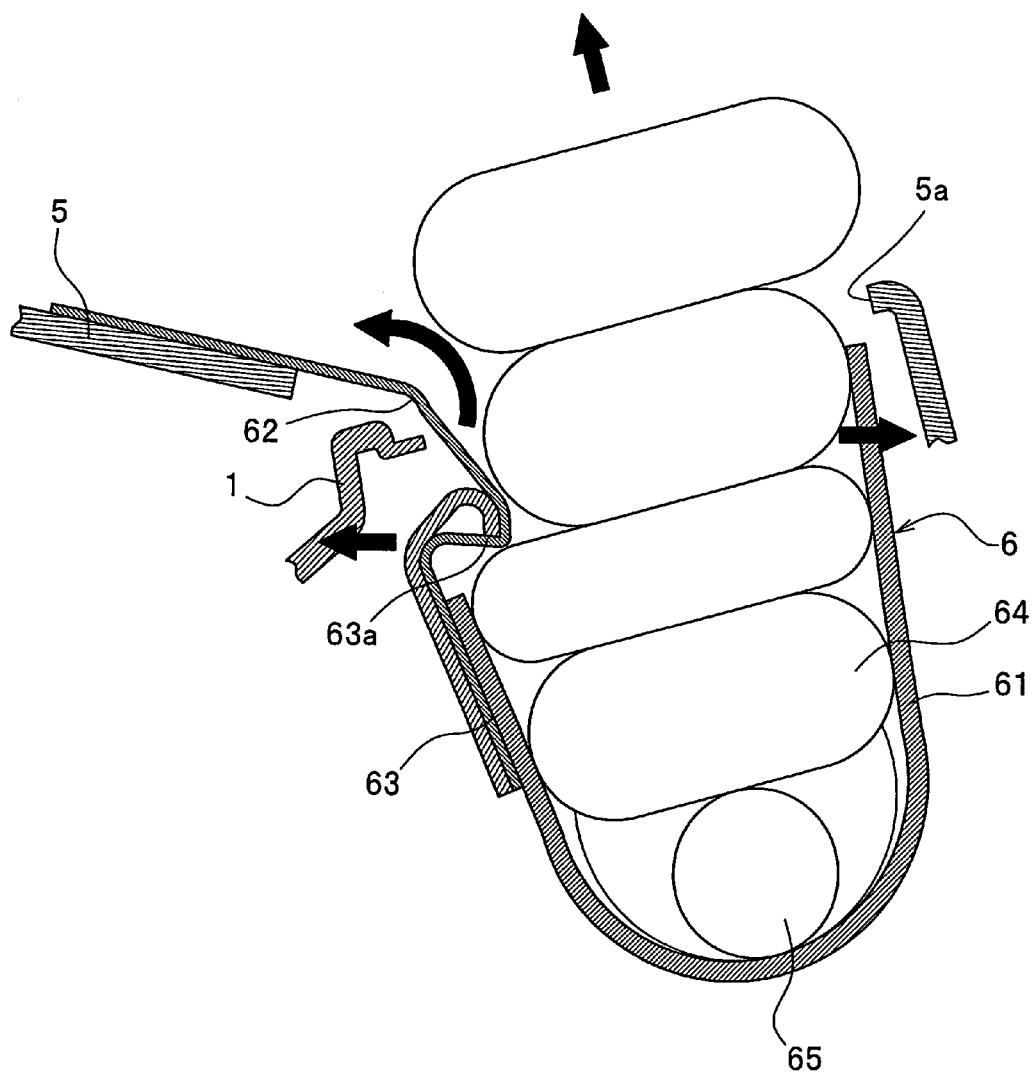
FIG. 7 explains the operation of the air bag device according to the first embodiment.

With reference to FIGS. 4 to 7, the operation of the air bag device 6 will be described. The air bag device 6 operates when the vehicle collides with a collision object such as a pedestrian. Upon detection of a collision with a collision object, the inflators 65 inflate the air bag 64 by feeding air (gas) into the air bag 64. The air bag 64 expands in the upward direction. As seen in FIG. 5, the air bag 64 firstly expands within the retainer 61 and lifts up the lid 5, so that the lid 5 breaks off at the slit 5a. As seen in FIGS. 6 and 7, the expansion of the air bag 64 further lifts up the lid 5 and then fully opens the lid 5.

During the release of the lid 5, the hinge member 62 is stretched out and extends in the upward direction. After the hinge member 62 comes into contact with the distal end 63a of the guide plate 63, the hinge member 62 rotates around the distal end 63a. Therefore, as shown in FIG. 6, the hinge member 62 is bent to rotate in the anticlockwise direction around the distal end 63a of the guide plate 63, thereby releasing the lid 5 in the upward direction of the retainer 61.

As shown in FIG. 7, the air bag 64 then inflates in the upward direction and fully expands in front of the front windshield 24. See FIG. 1. As seen in FIGS. 5 to 7, the opening side of the retainer 61 receives an expansion force of the air bag 64 and is slightly deformed outward.

According to this air bag device 6, the expansion of the air bag 64 firstly lifts up the lid 5, and then rotates the hinge member 62 for a predetermined rotation angle with the distal end 63a of the guide plate 63 being the fulcrum. Therefore, even if the lid 5 is arranged in a position lower than the hood 21, it is possible to open the lid 5 without interfering with other vehicular parts.

Second Embodiment

An air bag device 50 according to the second embodiment of the present invention will be described. The structure of the air bag device 50 is substantially the same as the air bag device 6 according to the first embodiment except for the mounting structure for securing to the vehicle body.

Figure 8:
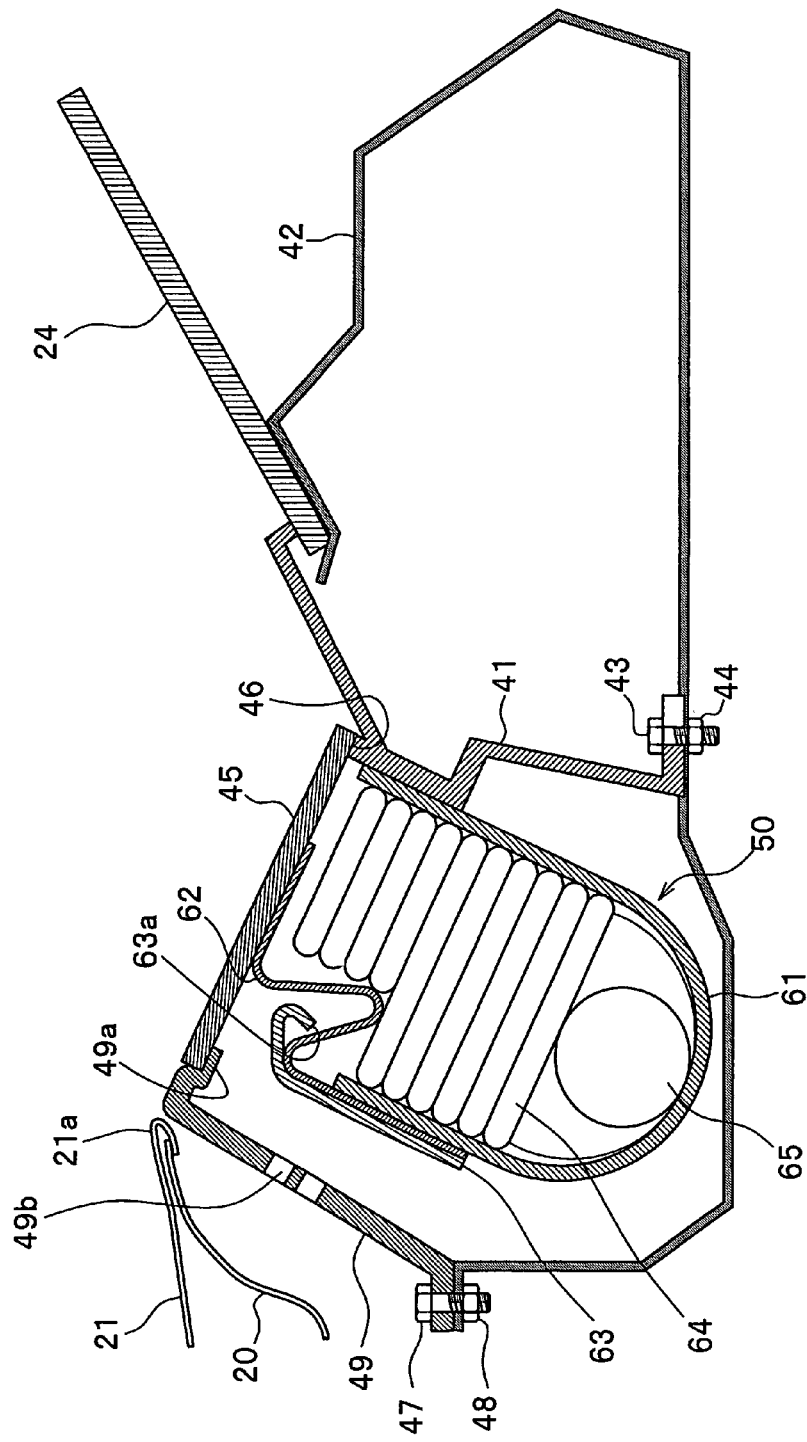
FIG. 8 is a view similar to FIG. 2 but illustrates an air bag device according to a second embodiment of the present invention.

As seen in FIG. 8, the air bag device 50 positioned beneath the lid 45 is fixed to the vehicle in such a manner that the outer surface of the retainer 61 as a casing is welded to the rear cowl top 41. The rear cowl top 41 is fixed to a dashboard upper 42 which extends beneath the air bag device 50 by bolts 43 and nuts 44.

A front cowl top 49 is joined to the front end of the dashboard upper 42 by bolts 47 and nuts 48. The rear end 21a of the hood 21 which is supported by the hood supporting member 20 is positioned above the ventilation hole 49b of the front cowl top 49. At the rear end of the front cowl top 49 is arranged the front end of the lid 45 which is positioned by a stepped portion 49a. Although in this preferred embodiment the lid 45 overlaps the front cowl top 49, this joint structure is not limited to this specific structure and other structures may be employed as long as the lid 45 is readily separated from the front cowl top 49 upon inflation of the air bag 64. As an example, the lid 45 and the front cowl top 49 are joined together by adhesive with lower adhesive strength.

The rear end of the lid 45 is joined to the rear cowl top 41 at a joint portion 46. As long as the lid 45 is readily separated from the rear cowl top 41, the joint structure therebetween is not limited to a specific structure. As an example, the lid 45 and the rear cowl top 41 are joined together by adhesive with lower adhesive strength. The front end side of the front windshield 24 is positioned between the rear end of the rear cowl top 46 and the dashboard upper 42.

The retainer 61 of the air bag device 50 is made of steel, etc. The lid 45 is made of a resin material. To connect the lid 45 and the retainer 61, hinge members 62 made of steel are welded to the lid 45. The retainer 61 is further welded to the rear cowl top 41 which is made of steel.

As shown in FIG. 8, the air bag device 50 mainly includes the retainer 61 having an opening at its upper end as seen from the front of the figure, the lid 45 for covering the opening of the retainer 61, at least one hinge member 62 connecting the retainer 61 and the lid 45, at least one guide plate 63 having a hook-shaped or J-shaped cross section to define a recess, the air bag 64 accommodated in the retainer 61, and at least one inflator 65 for feeding air (gas) into the air bag 64.

The hinge member 62 is substantially W-shaped in cross section. One end portion of the hinge member 62 is fixed to the reverse surface of the lid 45 at one side thereof and the other end portion of the hinge member 62 is fixed to the outer surface of the retainer 61. The hinge member 62 is bent at the mid portion to provide a protruding portion. The hinge member 62 is arranged such that the protruding portion thereof is directed to the inside of the retainer 61 while the opposite dent portion thereof is directed to the external of the retainer 61 that is the upward direction of FIG. 8.

The guide plate 63 is secured to the retainer 61 such that the distal end 63a of the hook head portion is positioned in the dent portion of the hinge member 62 and the hook body portion is fixed to the hinge member 62 which is welded to the retainer 61.

Figure 9:
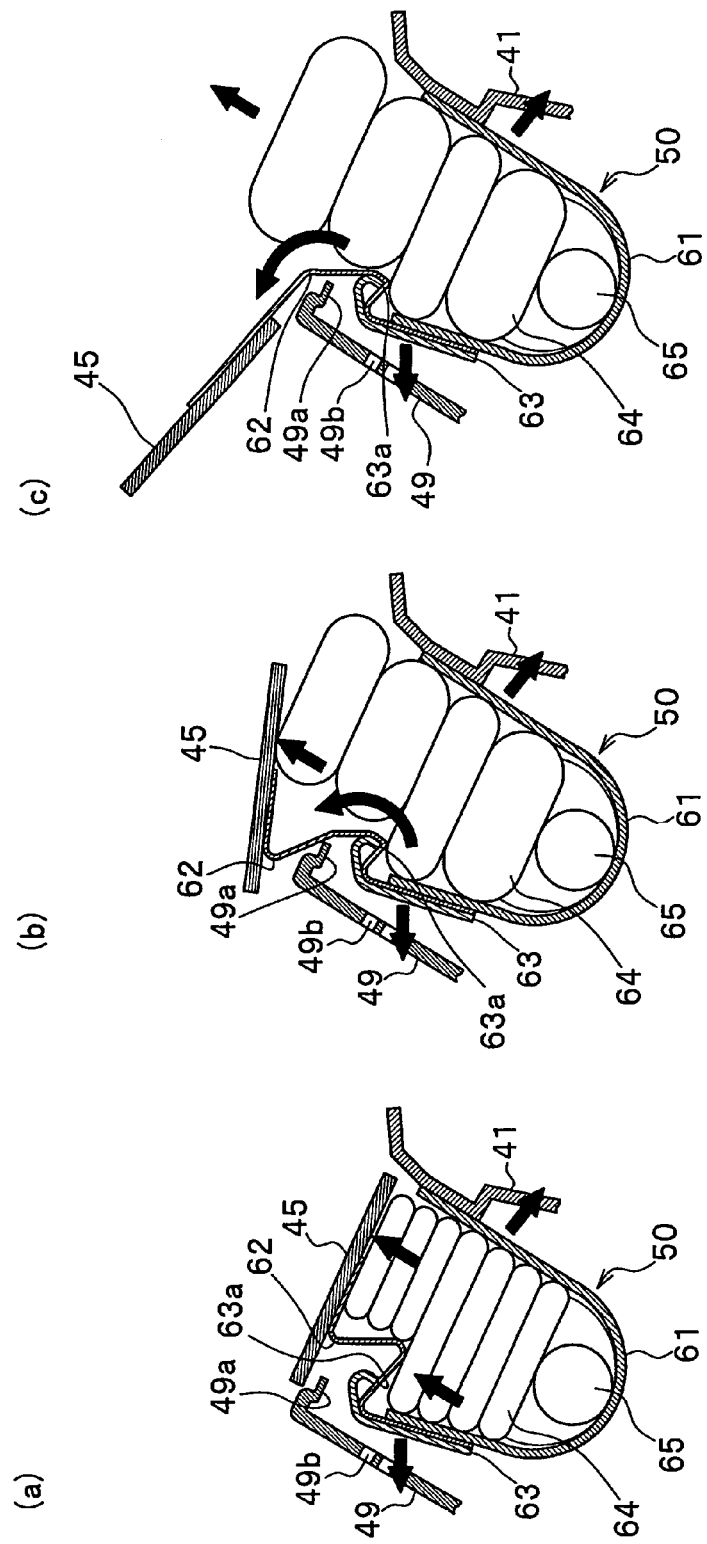
FIG. 9 explains the operation of the air bag device shown in FIG. 8.

With reference to FIGS. 8 and 9, the operation of the air bag device 50 will be described. In FIG. 9, the expansion states of the air bag 50 are shown in the order from (a) to (c). The air bag device 50 operates when the vehicle collides with a collision object such as a pedestrian. Upon detection of a collision with a collision object, the inflators 65 inflate the air bag 64 by feeding air (gas) into the air bag 64. The air retainer 61 and lifts up the lid 45, so that the lid 45 separates off from the front cowl top 49 and the rear cowl top 41. As seen in FIGS. 9(b) and 9(c), the expansion of the air bag 64 further lifts up the lid 45 and then fully opens the lid 45.

During the release of the lid 45, the hinge member 62 is stretched out and extends in the upward direction. After the hinge member 62 comes into contact with the distal end 63a of the guide plate 63, the hinge member 62 rotates around the distal end 63a. Therefore, as shown in FIG. 9(b), the hinge member 62 is bent to rotate in the anticlockwise direction around the distal end 63a of the guide plate 63, thereby releasing the lid 45 in the upward direction of the retainer 61. As shown in FIG. 9(c), the air bag 64 then inflates in the upward direction and fully expands in front of the front windshield 24. See FIG. 1. As seen in FIGS. 8 and 9, the opening side of the retainer 61 receives an expansion force of the air bag 64 and is slightly deformed outward.

According to this air bag device 50, the expansion of the air bag 64 firstly lifts up the lid 45, and then rotates the hinge member 62 for a predetermined rotation angle with the distal end 63a of the guide plate 63 being the fulcrum. Therefore, even if the lid 45 is arranged in a position lower than the hood 21, it is possible to open the lid 45 without interfering with other vehicular parts.

Figure 10A:
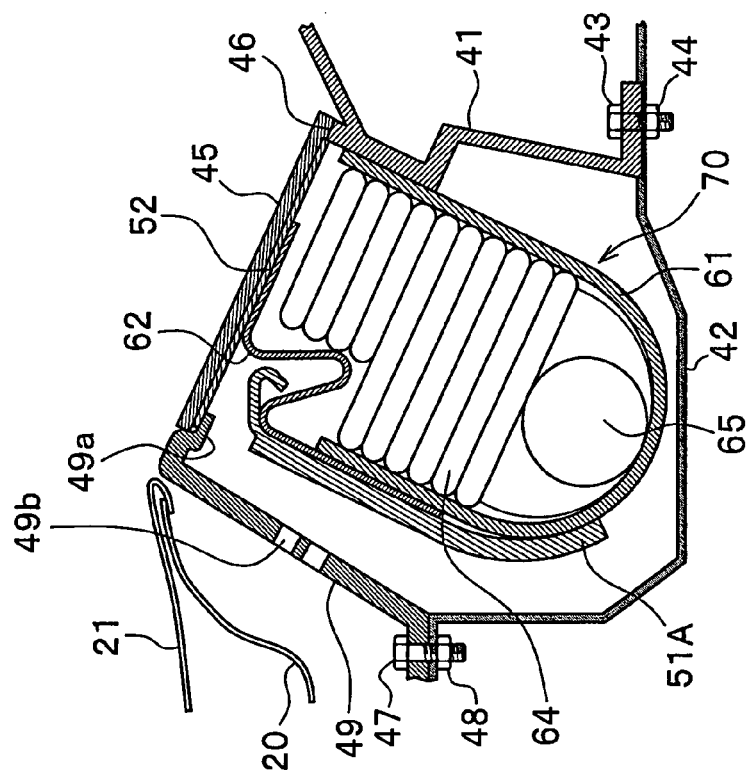
FIGS. 10A and 10B are sectional views illustrating Modification 1 and Modification 2 of the air bag device according to the second embodiment.
Figure 10B:
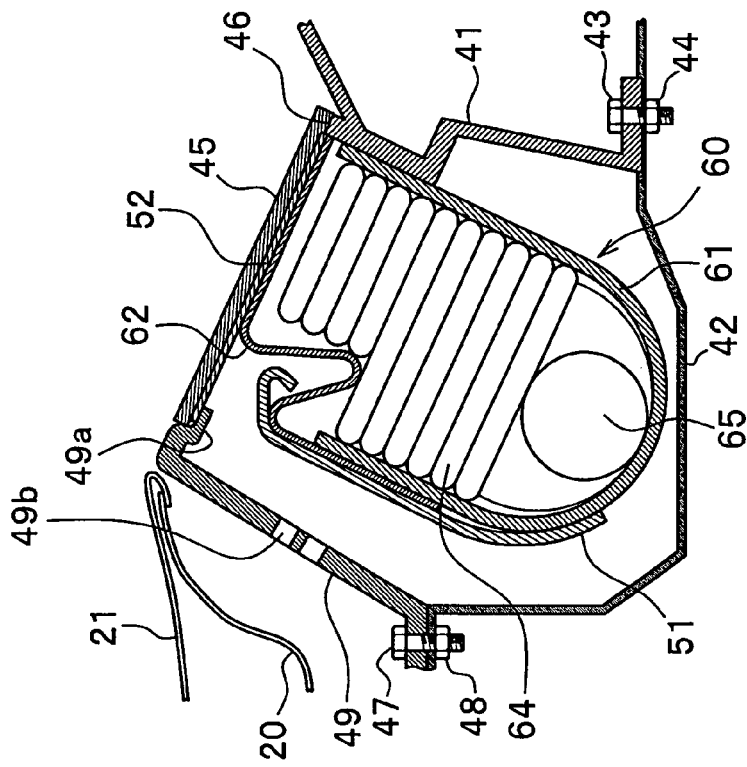

Next, with reference to FIGS. 10A and 10B, modifications of the second embodiment will be described. These modifications may be adapted to the first embodiment. FIG. 10A shows Modification 1 and FIG. 10B shows Modification 2. In these figures, parts similar to those previously described with reference to the second embodiment are denoted by the same reference numerals, and detailed description thereof will be omitted.

Modification 1

As shown in FIG. 10A, an air bag device 60 according to Modification 1 is substantially the same as the air bag device 50 according to the second embodiment except for the shape of the guide plate 51 and the use of a reinforcement plate 52. To be more specific, the guide plate 51 is formed such that the hook body portion thereof is elongated to the lower portion of the retainer 61 along and over the hinge member 62. Since the strength of the retainer 61 is enhanced by the guide plate 51, it is possible to prevent the opening of the retainer 61 from being deformed upon expansion of the air bag 64.

The reinforcement plate 52 is welded to the reverse surface of the lid 45, and the hinge members 62 are connected to the reinforcement plate 52. The reinforcement plate 52 is made of steel, etc. The hinge members 62 are welded to the reinforcement plate 52. The reinforcement plate 52 is provided to counteract the expansion force of the air bag 64 which deforms a center part of the lid 45 to swell in the upward direction in a state where the lid 45 is connected to the front cowl top 49 and the rear cowl top 41. Providing the reinforcement plate 52 can prevent the lid 45 from being deformed and broken off. Therefore, it is possible to prevent the lid 45 from being broken off and scattered out.

Modification 2

As shown in FIG. 10B, an air bag device 70 according to Modification 2 is substantially the same as the air bag device 50 according to the second embodiment except for the shape of the guide plate 51A and the use of a reinforcement plate 52. The reinforcement plate 52 is the same as that used in Modification 1. This guide plate 51A is thicker than the guide plate 51 according to Modification 1. Therefore, it is possible to more reliably prevent a deformation at the opening of the retainer 61 as compared with the air bag device 60 of Modification 1.

Figure 11A:
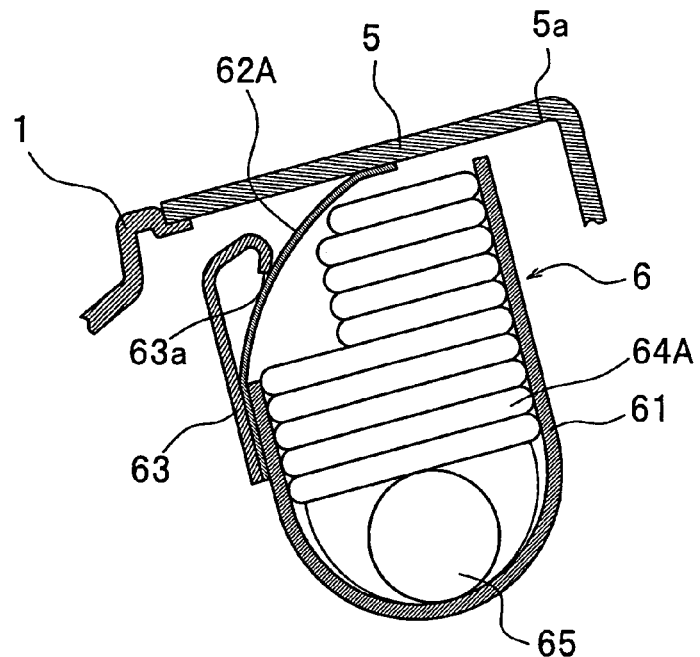
FIGS. 11A and 11B are sectional views illustrating Modification 3 and Modification 4 of the air bag device according to the first embodiment.
Figure 11B:
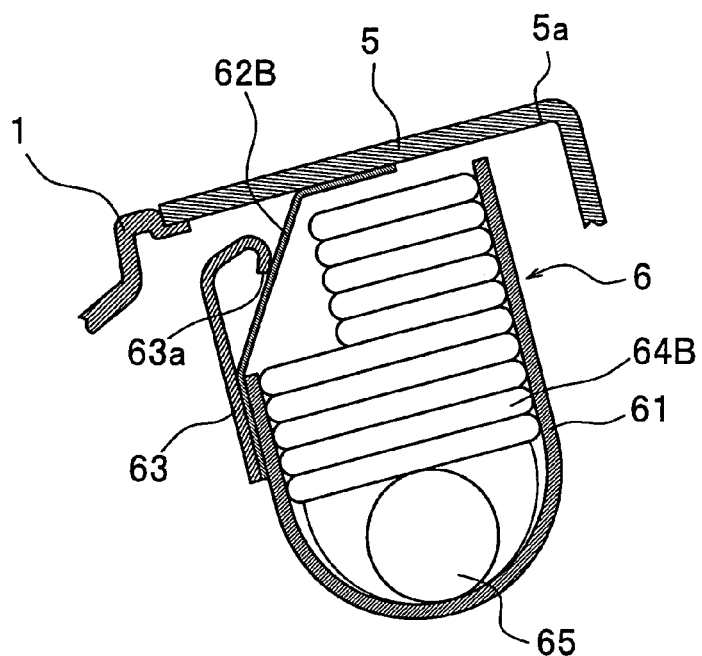
Figure 12:
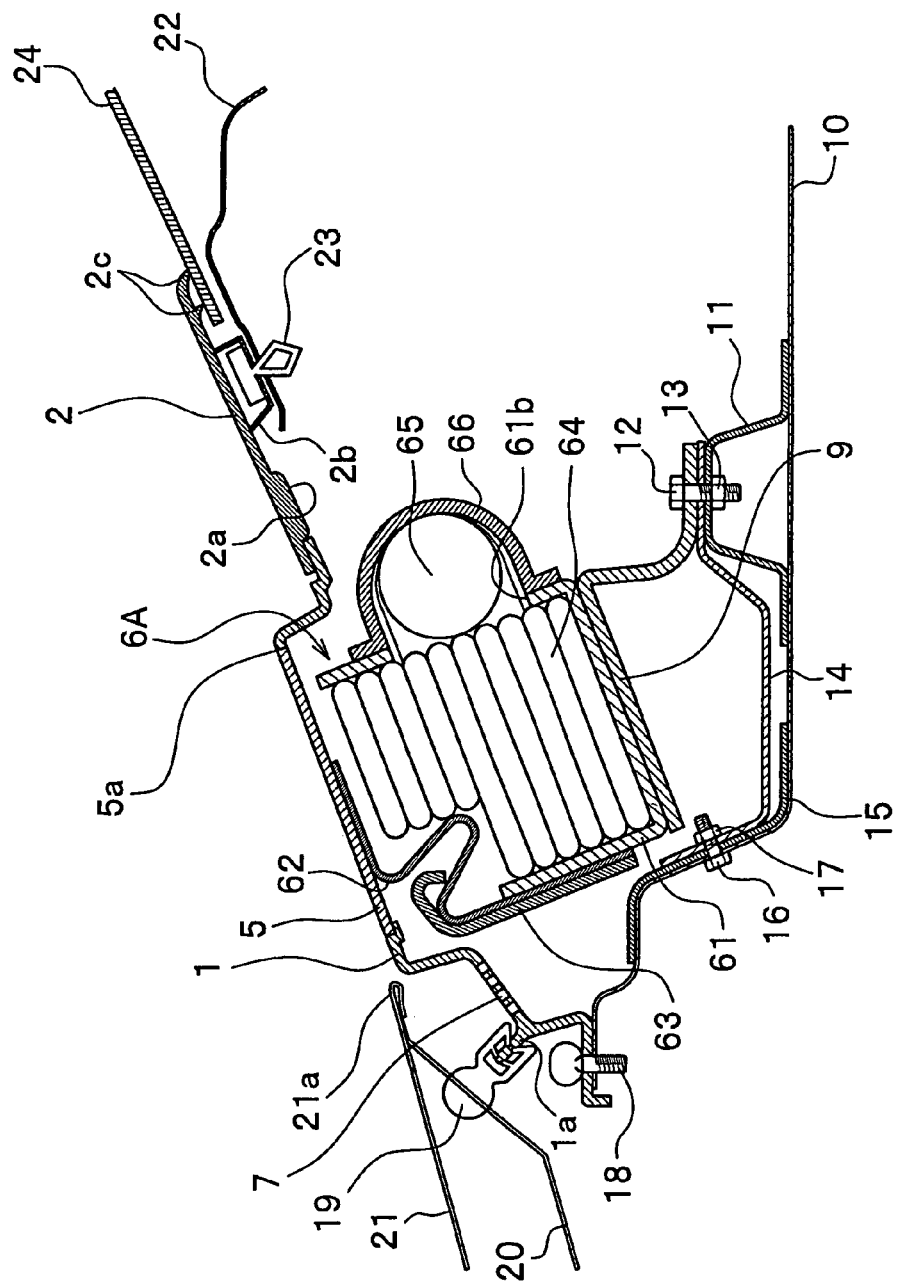
FIG. 12 is a view similar to FIG. 2 but illustrates an air bag device according to a third embodiment of the present invention.

Next, with reference to FIGS. 11A and 11B, modifications of the hinge member 62 according to the first embodiment will be described. FIG. 11A shows Modification 3 and FIG. 11B shows Modification 4.

Modification 3

As shown in FIG. 11A, the air bag device 6 includes a hinge member 62A having U-shaped cross section. One end portion of the hinge member 62A is fixed to the retainer 61 and the other end portion of the hinge member 62A is fixed to the lid 5. A part of the hinge member 62A is positioned under the distal end 63a of the guide plate 63. Therefore, when the air bag 64A inflates, the hinge member 62A rotates for a predetermined rotation angle with the distal end 63a of the guide plate 63 being the fulcrum.

Modification 4

As shown in FIG. 11B, the air bag device 6 includes a hinge member 62B having a flat surface (straight line in cross section) at a part where the hinge member 62B contacts with the distal end 63a of the guide plate 63. One end portion of the hinge member 62B is fixed to the retainer 61 and the other end portion of the hinge member 62B is fixed to the lid 5. A part of the hinge member 62B is positioned under the distal end 63a of the guide plate 63. Therefore, when the air bag 64B inflates, the hinge member 62B rotates for a predetermined rotation angle with the distal end 63a of the guide plate 63 being the fulcrum.

Third Embodiment

With reference to FIGS. 12 to 16, an air bag device 6A according to the third embodiment will be described. The air bag device 6A is substantially the same as the air bag device 6 according to the first embodiment except for the mounting position of the inflator(s). Parts similar to those previously described with reference to the first embodiment are denoted by the same reference numerals, and detailed description thereof will be omitted.

The air bag device 6A according to the third embodiment includes an inflator 65 arranged behind the retainer 61. A plurality of inflators 65 may be arranged in the width direction of the vehicle behind the retainer 61. The inflator 65 is housed in an inflator cover 66. The inflator cover 66 defines a space communicating with a rear opening 61b formed in the rear surface of the retainer 61 and extending rearward of the vehicle on which the air bag device 6A is mounted. The inflator cover 66 is attached to the rear surface of the retainer 61 by welding, etc. This makes it possible to reduce the height of the retainer 61, so that when the air bag 64 inflates within the retainer 61, a load exerted by the air bag 64 to expand side surfaces of the retainer 61 can be decreased, thereby decreasing the deformation amount (i.e., the extent to which the retainer opens) at the opening of the retainer 61 at which the lid 5 is released in the upward direction as seen from the front of FIG. 12.

A space can be obtained between the bottom end of the air bag 64 (retainer 61) and the dashboard upper 10. Instead, the height of the retainer 61 can be increased to accommodate a large-volume air bag in the retainer 61. In this instance, since the inflator 65 is arranged behind the retainer 61 instead of being arranged in a lower small space of the retainer 61, a large-volume inflator(s) can be used.

The inflator cover 66 is formed to have a vault-shape in conformity with the cylindrical shape of the inflator 65. The inflator cover 66 is fixed to the rear surface of the retainer 61 so as to cover the rear opening 61b. The inflator 65 is secured to the inner surface of the inflator cover 66. The shape of the inflator cover 66 is not limited to this vault-shape, and other shapes such as rectangular parallelepiped may be used. The inflator cover 66 may be attached to the retainer 61, for example, by using adhesive, etc. This can prevent the inflator 65 from coming off from the rear opening 61b upon ignition of the inflator 65.

Figure 13:
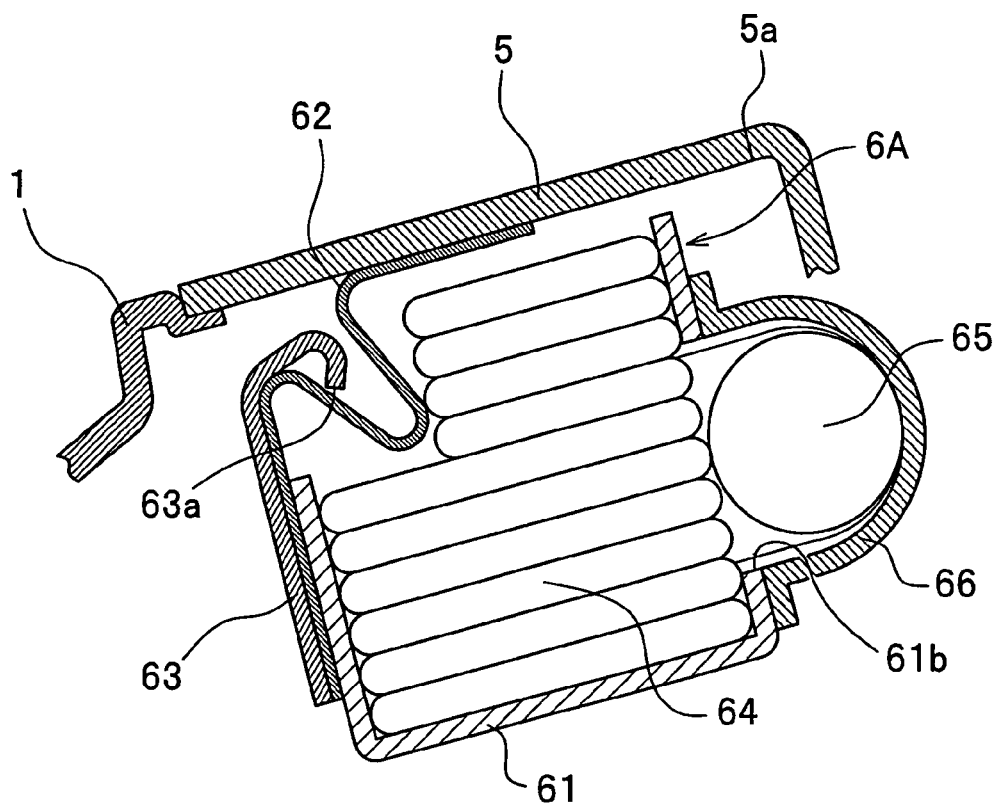
FIG. 13 is a sectional view illustrating main parts of the air bag device according to the third embodiment.

As shown in FIG. 13, the air bag device 6A mainly includes the retainer 61 having an opening at its upper end as seen from the front of the figure, the lid 5 for covering the opening of the retainer 61, at least one hinge member 62 connecting the retainer 61 and the lid 5, at least one guide plate 63 having a hook-shaped or J-shaped cross section to define a recess, the air bag 64 accommodated in the retainer 61, the inflator cover 66 which defines a space in communication with the rear opening 61b formed in the rear surface of the retainer 61, the inflator 65 housed in the inflator cover 66. To be more specific, the inflator 65 is arranged behind the rear surface of the retainer 61.

The hinge member 62 is substantially W-shaped in cross section. One end portion of the hinge member 62 is fixed to the reverse surface of the lid 5 at one side thereof and the other end portion of the hinge member 62 is fixed to the outer surface of the retainer 61. The hinge member 62 is bent at the mid portion to provide a protruding portion. The hinge member 62 is arranged such that the protruding portion thereof is directed to the inside of the retainer 61 while the opposite dent portion thereof is directed to the external of the retainer 61 that is the upward direction of FIG. 13.

The guide plate 63 is secured to the retainer 61 such that the distal end 63a of the hook head portion is positioned in the dent portion of the hinge member 62 and the hook body portion is fixed to the hinge member 62 which is welded to the retainer 61. The guide plate 63 is made from a metal plate such as of steel. The hinge member 62 and the retainer 61 are also made of metal such as steel.

Figure 14:
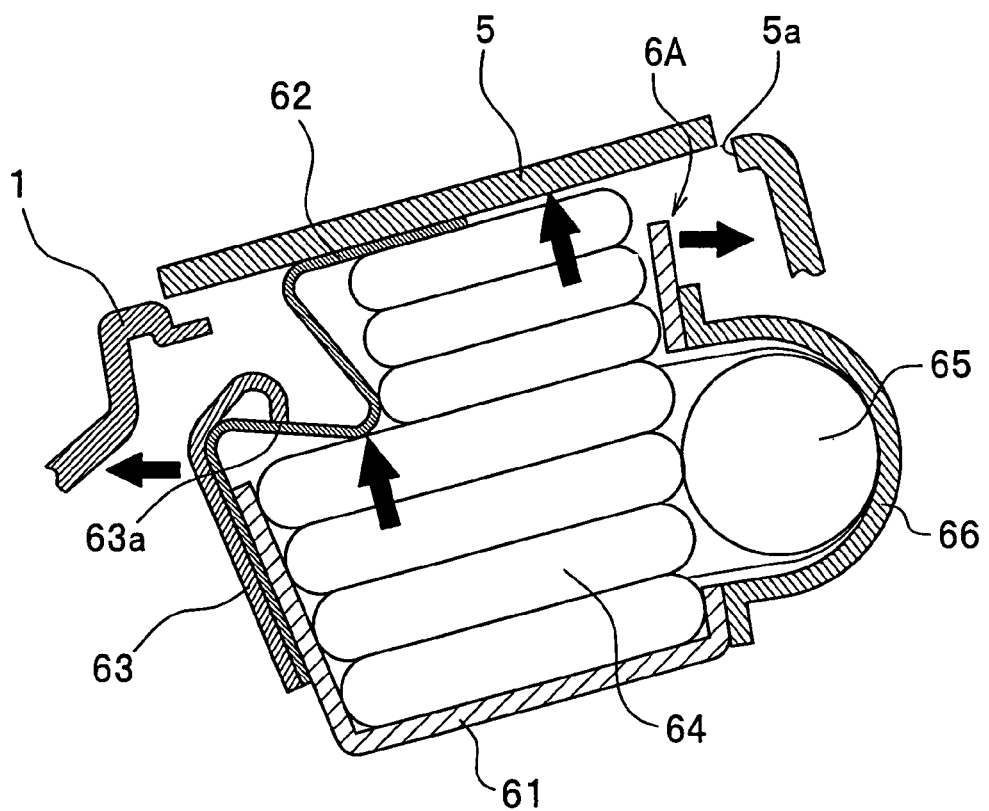
FIG. 14 explains the operation of the air bag device according to the third embodiment.
Figure 15:
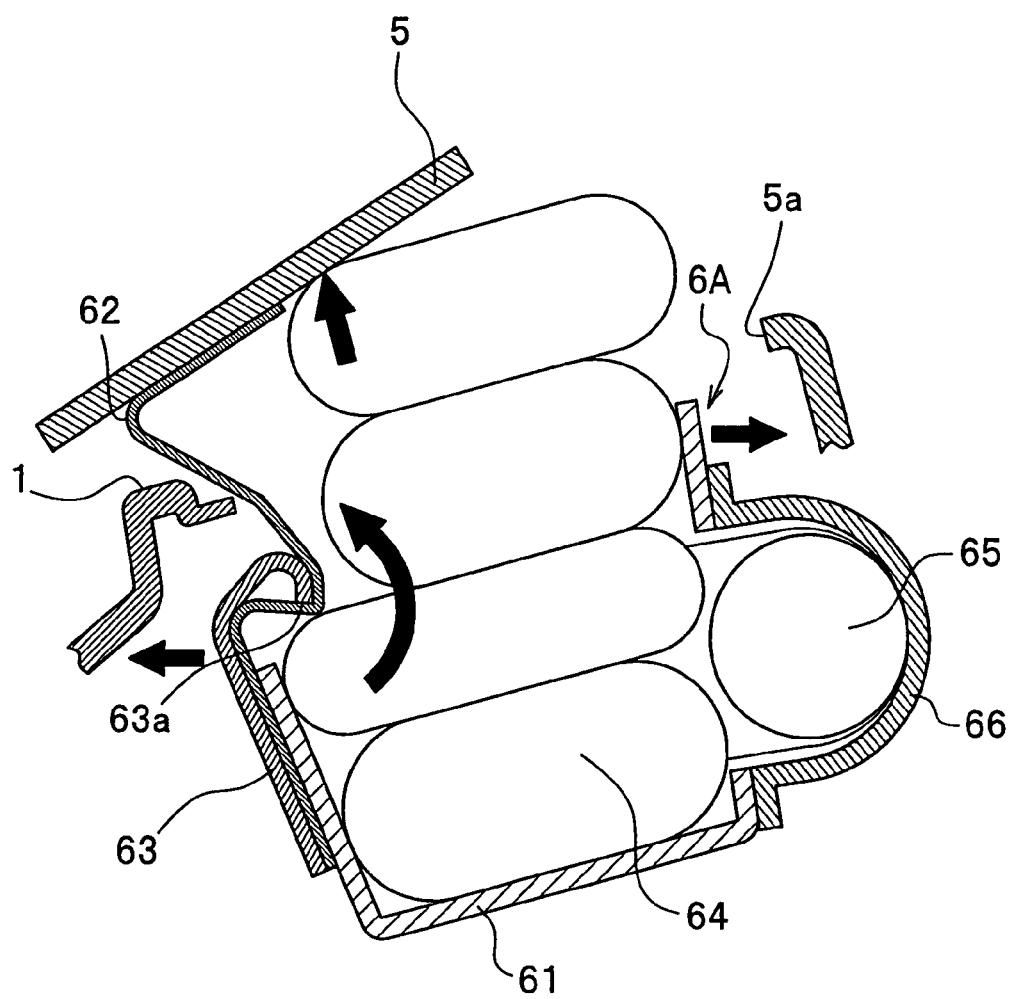
FIG. 15 explains the operation of the air bag device according to the third embodiment.
Figure 16:
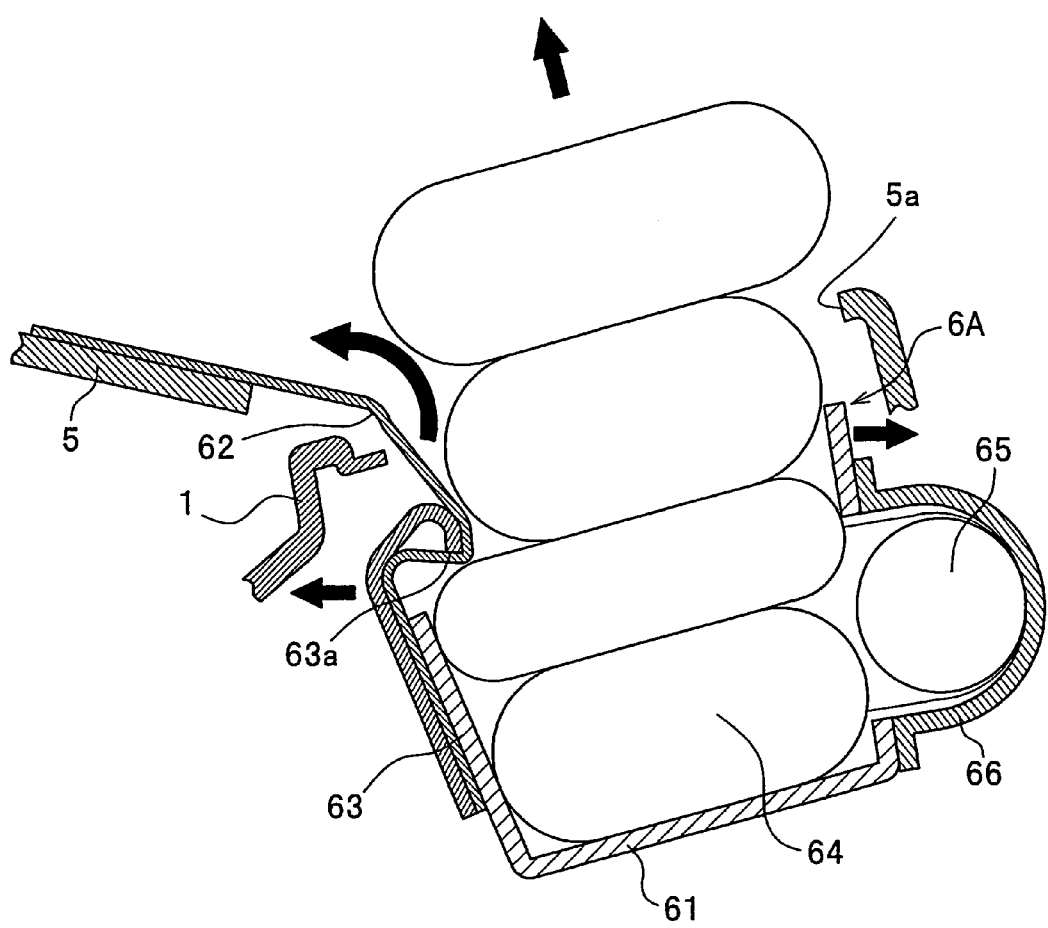
FIG. 16 explains the operation of the air bag device according to the third embodiment.

With reference to FIGS. 13 to 16, the operation of the air bag device 6A will be described. The air bag device 6A operates when the vehicle collides with a collision object such a pedestrian. Upon detection of a collision with a collision object, the inflator(s) 65 inflates the air bag 64 by feeding air (gas) into the air bag 64. The air bag 64 expands in the upward direction. The retainer 61 does not accommodate inflators 65, and only the air bag 64 is accommodated in the retainer 61. Therefore, the retainer 61 only requires a volume sufficient to provide a space for accommodating the air bag 64 that has been compactly folded. According to this air bag device 6A, since the gap between the retainer 61 and the air bag 64 is small, the air bag 64 inflates while being guided along the inner wall of the retainer 61. This makes it possible to effectively guide the air bag 64 toward the opening of the retainer 61 during the expansion of the air bag 64. As seen in FIG. 14, the air bag 64 firstly expands within the retainer 61 and lifts up the lid 5, so that the lid breaks off at the slit 5a. As seen in FIGS. 15 and 16, the expansion of the air bag 64 further lifts up the lid 5 and then fully opens the lid 5.

Since the height of the retainer 61 is shorter as compared with the arrangement in which the inflator 65 is accommodated at the bottom of the retainer 61, the volume of the retainer 61 is decreased, so that when the air bag 64 inflates within the retainer 61, a load exerted by the air bag 64 to expand side surfaces of the retainer 61 can be decreased, thereby decreasing the deformation amount at the opening of the retainer 61.

During the release of the lid 5, the hinge member 62 is stretched out and extends in the upward direction. After the hinge member 62 comes into contact with the distal end 63a of the guide plate 63, the hinge member 62 rotates around the distal end 63a. Therefore, as shown in FIG. 15, the hinge member 62 is bent to rotate in the anticlockwise direction around the distal end 63a of the guide plate 63, thereby releasing the lid 5 in the upward direction of the retainer 61. As shown in FIG. 16, the air bag 64 then inflates in the upward direction and fully expands in front of the front windshield 24. See FIG. 1. As seen in FIGS. 14 to 16, the opening side of the retainer 61 receives an expansion force of the air bag 64 and is slightly deformed outward.

According to this air bag device 6A, the expansion of the air bag 64 firstly lifts up the lid 5, and then rotates the hinge member 62 for a predetermined rotation angle with the distal end 63a of the guide plate 63 being the fulcrum. Therefore, even if the lid 5 is arranged in a position lower than the hood 21, it is possible to open the lid 5 without interfering with other vehicular parts.

As described above, since the inflator 65 is arranged behind the retainer 61, it is possible to reduce the height (length in the vertical direction of the vehicle body) of the retainer 61. Therefore, when the air bag 64 inflates within the retainer 61, a load exerted by the air bag 64 to expand side surfaces of the retainer 61 can be decreased, thereby decreasing the deformation amount at the opening of the retainer 61. This makes it possible to more reliably prevent an interference of the lid 5 with the vehicular parts such as the hood 21 and the front cowl top 1. Instead, it is possible to increase the height of the retainer 61 to accommodate therein a large-volume air bag.

Modification 5

Figure 17A:
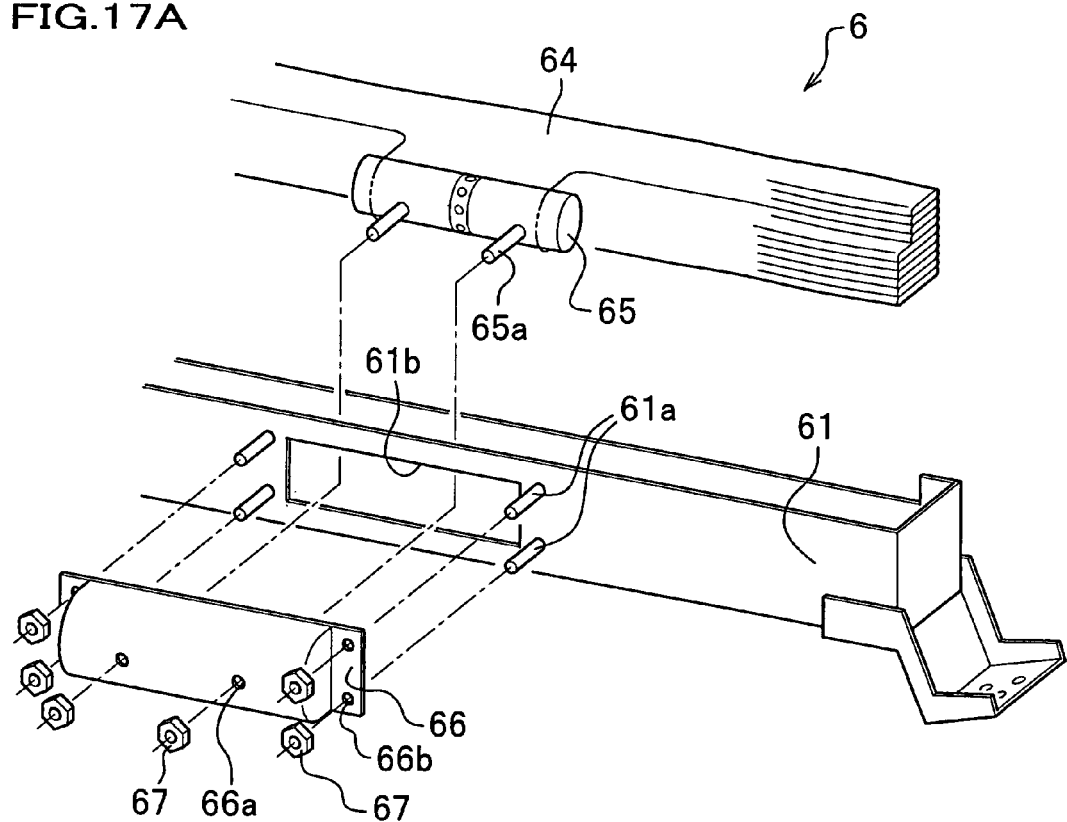
Figure 17B:
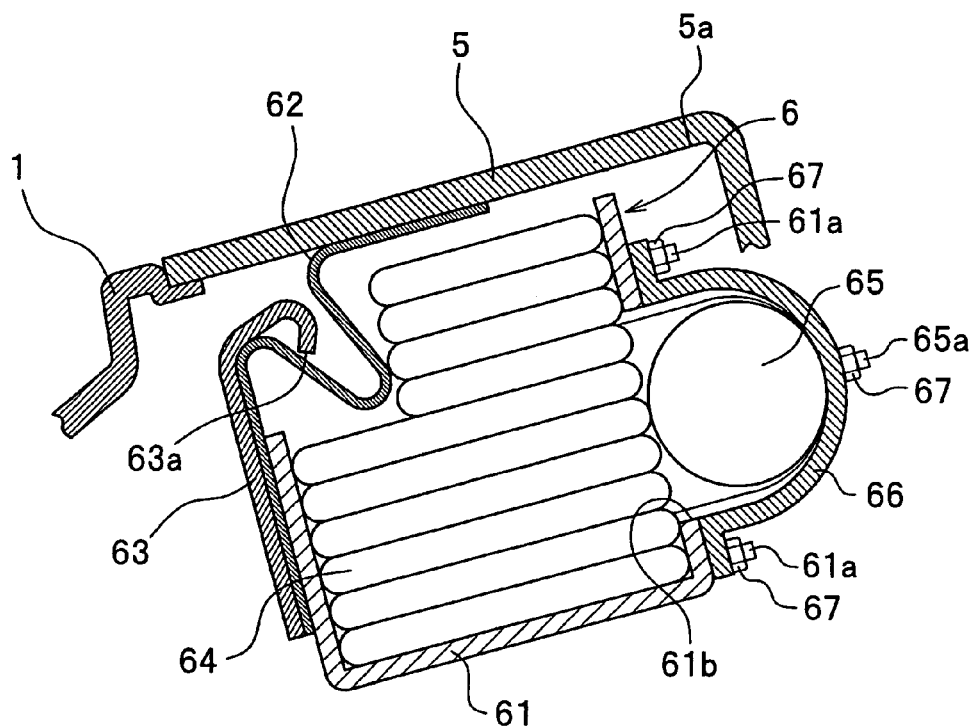

With reference to FIGS. 17A and 17B, a modification of the air bag device according to the third embodiment will be described. Parts similar to those previously described with reference to the third embodiment are denoted by the same reference numerals, and detailed description thereof will be omitted.

As shown in FIG. 17A, the air bag 64 is folded into a compact shape, and a part of the air bag 64 is wound around the inflator 65, so that the inflator 65 is attached to the air bag 64. The air bag 64 includes two parts: an expanding portion which is sealed against the inflator(s) 65 and into which air (gas) is introduced, and an inflator-holding portion in the form of a closed strip to provide a space into which the inflator(s) 65 is inserted from the sideward direction. Air inlets (not shown) of the air bag 64 are sealed against the air bag 64. An air bag module consisting of the inflator 65 and the air bag 64 is inserted from the opening of the retainer 61, during which the inflator 65 is pulled out through the rear opening 61b formed in the rear surface of the retainer 61. The inflator cover 66 is then attached to the retainer 61 so as to cover the inflator 65. Although not explained in the third embodiment, such attachment structure of the air bag module may be adapted to the air bag device 6A according to the third embodiment.

According to this modification, bolts 65a are attached to the inflator 65. The inflator cover 66 provides openings 66a for the insertion of the bolts 65a of the inflator 65 and openings 66b for the insertion of the bolts 61a of the retainer 61. The inflator cover 66 is firmly attached to the retainer 61 by inserting the openings 66a, 66b onto the corresponding bolts 65a, 61a and securing the inflator cover 66 with nuts 67. Accordingly, the air bag 64 is securely fixed to the retainer 61 (vehicle body), thereby preventing the air bag 64 and the inflator 65 from being come off together upon inflation of the air bag 64.

Fourth Embodiment

Figure 18:
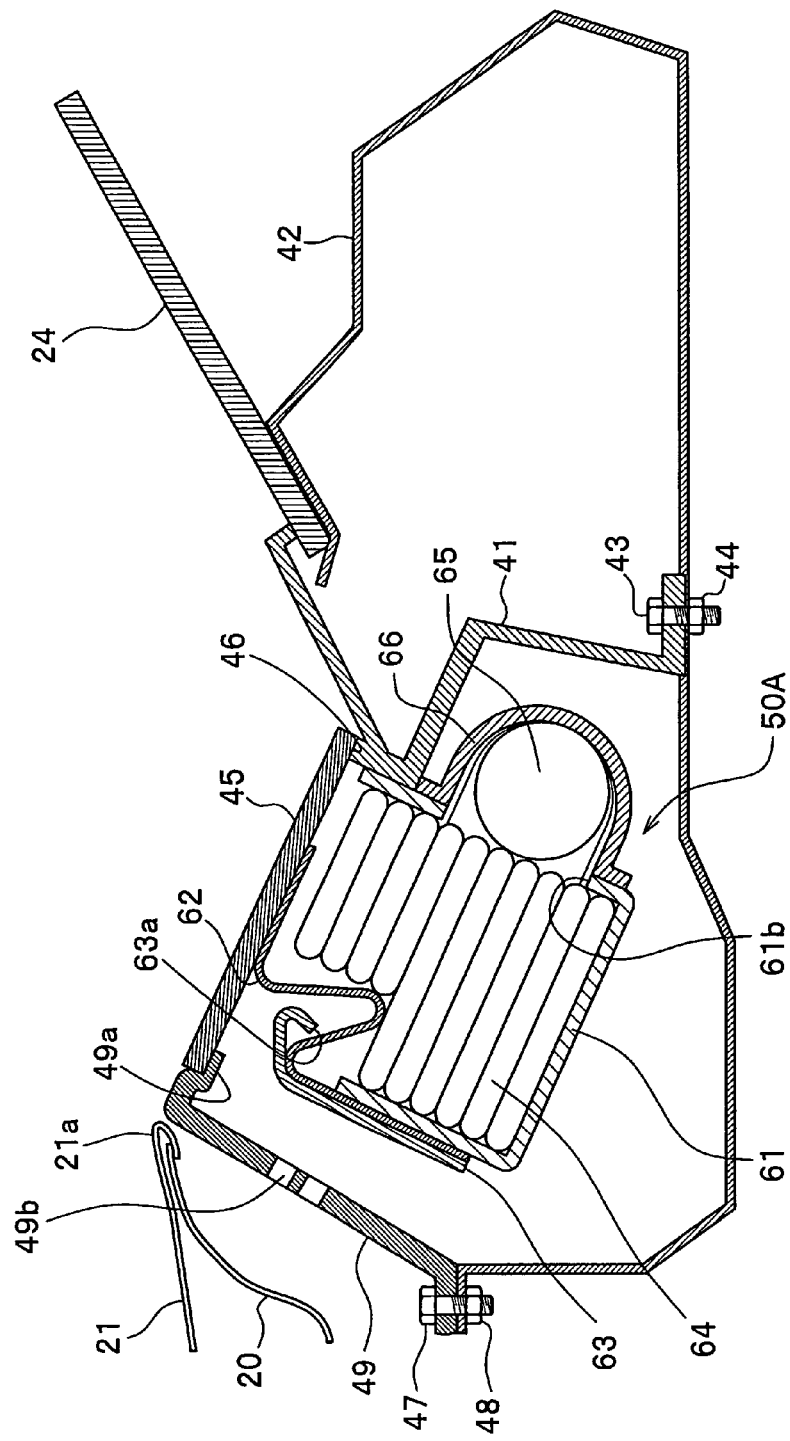
FIG. 18 is a view similar to FIG. 12 but illustrates an air bag device according to a fourth embodiment of the present invention.
Figure 19:
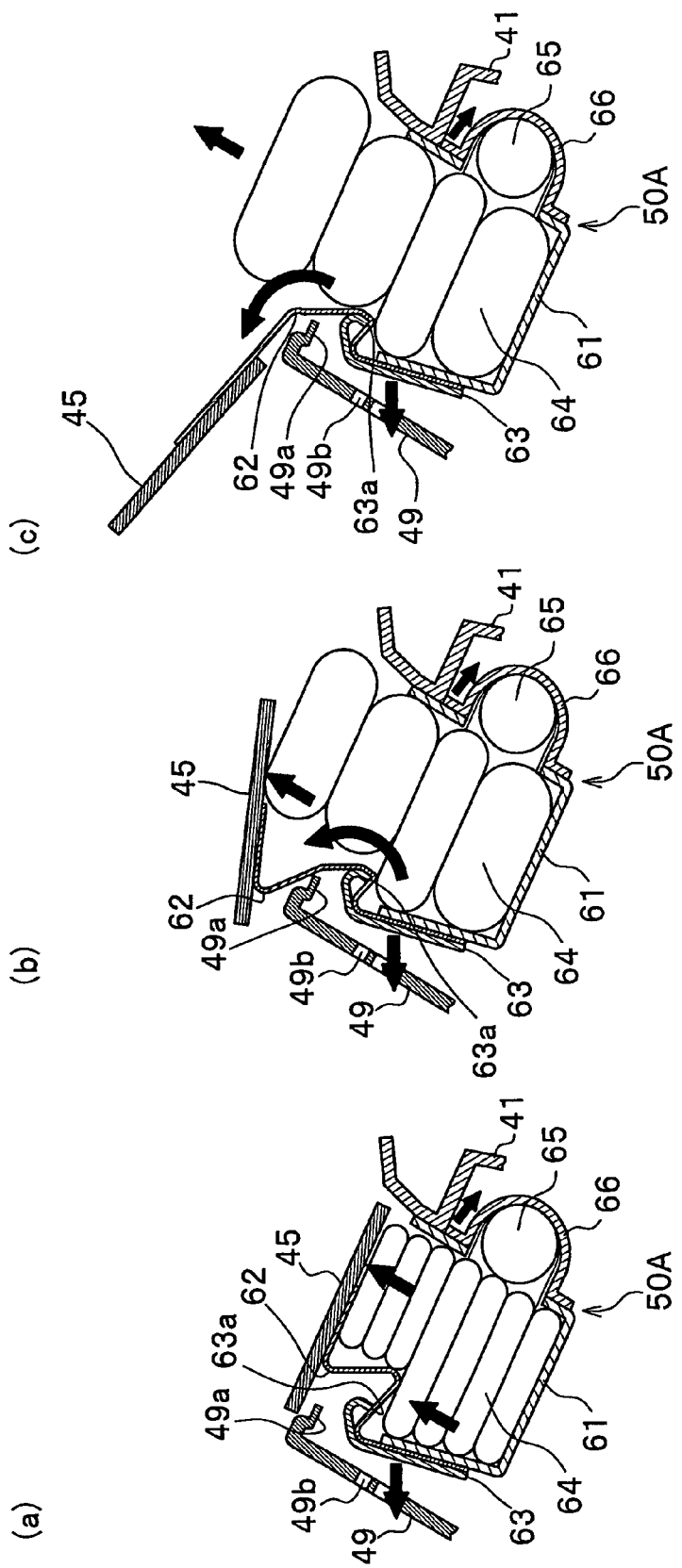
FIG. 19 explains the operation of the air bag device shown in FIG. 18.

With reference to FIGS. 18 and 19, an air bag device 50A according to the fourth embodiment of the present invention will be described. The structure of the air bag device 50A is substantially the same as the air bag device 6A according to the third embodiment except for the mounting structure for securing to the vehicle body.

As seen in FIG. 18, the air bag device 50A positioned beneath the lid 45 is fixed to the vehicle in such a manner that the outer surface of the retainer 61 as a casing is welded to the rear cowl top 41. The rear cowl top 41 is fixed to a dashboard upper 42 which extends beneath the air bag device 50A by bolts 43 and nuts 44.

A front cowl top 49 is joined to the front end of the dashboard upper 42 by bolts 47 and nuts 48. The rear end 21a of the hood 21 which is supported by the hood supporting member 20 is positioned above the ventilation hole 49b of the front cowl top 49. At the rear end of the front cowl top 49 is arranged the front end of the lid 45 which is positioned by a stepped portion 49a. Although in this preferred embodiment the lid 45 overlaps the front cowl top 49, this joint structure is not limited to this specific structure and other structures may be employed as long as the lid 45 is readily separated from the front cowl top 49 upon inflation of the air bag 64. As an example, the lid 45 and the front cowl top 49 are joined together by adhesive with lower adhesive strength.

The rear end of the lid 45 is joined to the rear cowl top 41 at a joint portion 46. As long as the lid 45 is readily separated from the rear cowl top 41, the joint structure therebetween is not limited to a specific structure. As an example, the lid 45 and the rear cowl top 41 are joined together by adhesive with lower adhesive strength. The front end side of the front windshield 24 is positioned between the rear end of the rear cowl top 46 and the dashboard upper 42.

The retainer 61 and the hinge members 62 of the air bag device 50A are made of steel, etc. The lid 45 is made of a resin material. Each hinge member 62 is welded to the retainer 61 at one end portion and to the lid 45 at the other end portion. The retainer 61 is also welded to the rear cowl top which is made of steel. The rear cowl top 41 and the retainer 61 may be secured together by bolts and nuts.

As shown in FIG. 18, the air bag device 50A mainly includes the retainer 61 having an opening at its upper end and a rear opening 61b at its rear surface as seen from the front of the figure, the lid 45 for covering the opening of the retainer 61, at least one hinge member 62 connecting the retainer 61 and the lid 45, at least one guide plate 63 having a hook-shaped or J-shaped cross section to define a recess, the air bag 64 accommodated in the retainer 61, the inflator cover 66 which defines a space in communication with the rear opening 61b formed in the rear surface of the retainer 61, and the inflator(s) 65 housed in the inflator cover 66. In this air bag device 50A, the inflator(s) 65 is arranged behind the retainer 61 as with the air bag device 6A according to the third embodiment.

The hinge member 62 is substantially W-shaped in cross section. One end portion of the hinge member 62 is fixed to the reverse surface of the lid 45 at one side thereof and the other end portion of the hinge member 62 is fixed to the outer surface of the retainer 61. The hinge member 62 is bent at the mid portion to provide a protruding portion. The hinge member 62 is arranged such that the protruding portion thereof is directed to the inside of the retainer 61 while the opposite dent portion thereof is directed to the external of the retainer 61 that is the upward direction of FIG. 18.

The guide plate 63 is secured to the retainer 61 such that the distal end 63a of the hook head portion is positioned in the dent portion of the hinge member 62 and the hook body portion is fixed to the hinge member 62 which is welded to the retainer 61.

With reference to FIGS. 18 and 19, the operation of the air bag device 50A will be described. In FIG. 19, the expansion states of the air bag 50A are shown in the order from (a) to (c). The air bag device 50A operates when the vehicle collides with a collision object such as a pedestrian. Upon detection of a collision with a collision object, the inflators 65 inflate the air bag 64 by feeding air (gas) into the air bag 64. The air bag 64 expands in the upward direction. As seen in FIG. 19(a), the air bag 64 firstly expands within the retainer 61 and lifts up the lid 45, so that the lid 45 separates off from the front cowl top 49 and the rear cowl top 41. As seen in FIGS. 19(b) and 19(c), the expansion of the air bag 64 further lifts up the lid 45 and then fully opens the lid 45.

During the release of the lid 45, the hinge member 62 is stretched out and extends in the upward direction. After the hinge member 62 comes into contact with the distal end 63a of the guide plate 63, the hinge member 62 rotates around the distal end 63a. Therefore, as shown in FIG. 19(b), the hinge member 62 is bent to rotate in the anticlockwise direction around the distal end 63a of the guide plate 63, thereby releasing the lid 45 in the upward direction of the retainer 61. As shown in FIG. 19(c), the air bag 64 then inflates in the upward direction and fully expands in front of the front windshield 24. See FIG. 1. As seen FIGS. 18 and 19, the opening side of the retainer 61 receives an expansion force of the air bag 64 and is slightly deformed outward.

According to this air bag device 50A, the expansion of the air bag 64 firstly lifts up the lid 45, and then rotates the hinge member 62 for a predetermined rotation angle with the distal end 63a of the guide plate 63 being the fulcrum. Therefore, even if the lid 45 is arranged in a position lower than the hood 21, it is possible to open the lid 45 without interfering with other vehicular parts. Therefore, the air bag device 50A provides the same advantages as the air bag device 6A according to the third embodiment. Further, since the retainer 61 is directly fixed to the rear cowl top 41 secured to the dashboard upper 42, there is no need to use brackets, etc. (see FIG. 12) according to the third embodiment. Therefore, according to the air bag device 50A, it is possible to provide a large space beneath the retainer 61 as compared with the arrangement of the third embodiment. Instead, it is also possible to increase the volume of the retainer 61 to accommodate therein a large-volume air bag.

Figure 20A:
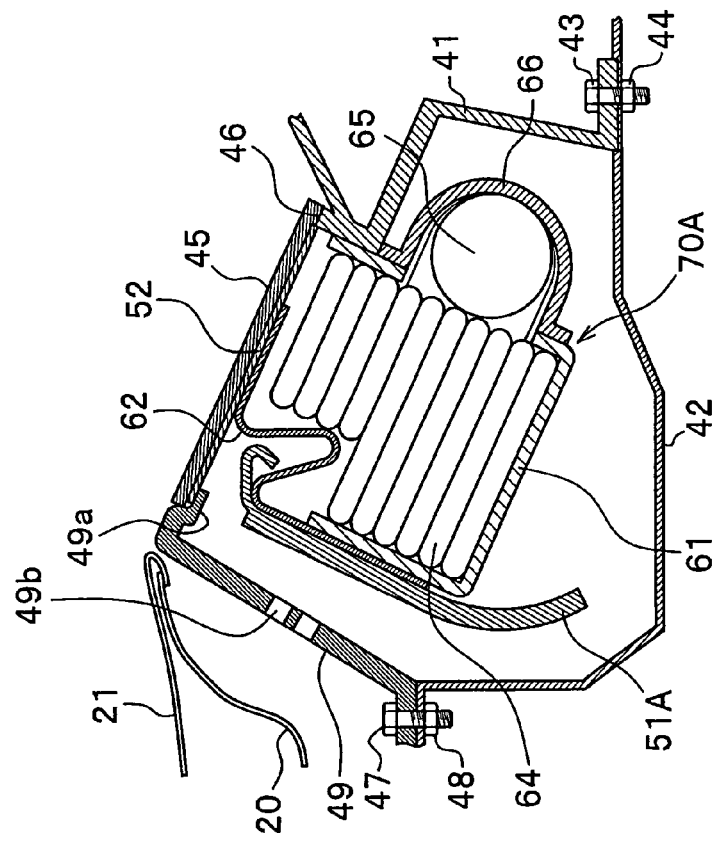
FIGS. 20A and 20B are sectional views illustrating Modification 6 and Modification 7 of the air bag device according to the fourth embodiment.
Figure 20B:
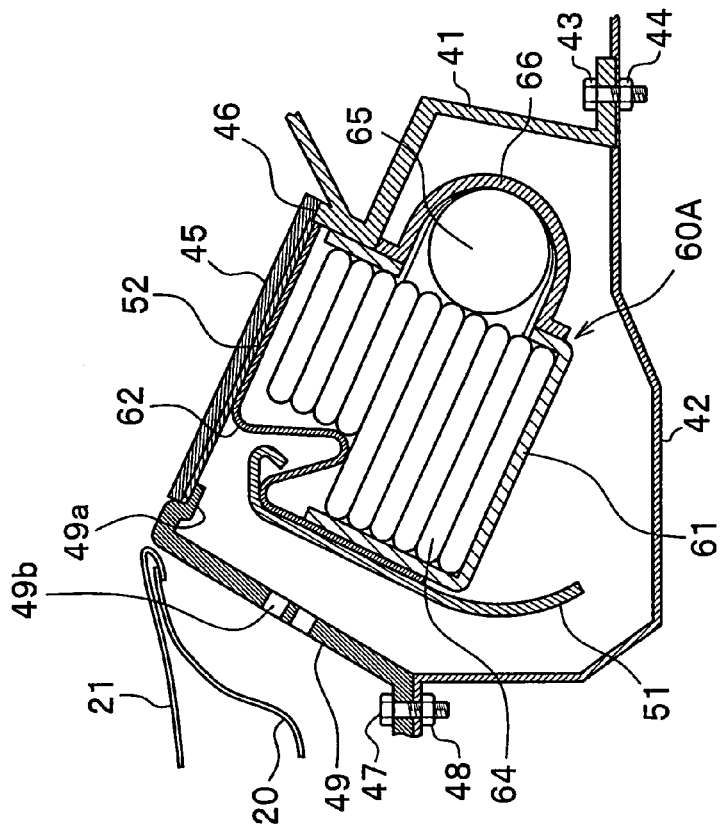

Next, with reference to FIGS. 20A and 20B, modifications of the fourth embodiment will be described. These modifications may be adapted to the third embodiment. FIG. 20A shows Modification 6 and FIG. 20B shows Modification 7. In these figures, parts similar to those previously described with reference to the fourth embodiment are denoted by the same reference numerals, and detailed description thereof will be omitted.

Modification 6

As shown in FIG. 20A, an air bag device 60A according to Modification 6 is substantially the same as the air bag device 50A according to the fourth embodiment except for the shape of the guide plate 51 and the use of a reinforcement plate 52. To be more specific, the guide plate 51 is formed such that the hook body portion thereof is elongated beyond the lower end portion of the retainer 61 along and over the hinge member 62. Since the strength of the retainer 61 is enhanced by the guide plate 51, it is possible to prevent the opening of the retainer 61 from being deformed upon expansion of the air bag 64.

The reinforcement plate 52 is welded to the reverse surface of the lid 45, and the hinge members 62 are connected to the reinforcement plate 52. The reinforcement plate 52 is made of steel, etc. The hinge members 62 are welded to the reinforcement plate 52. The reinforcement plate 52 is provided to counteract the expansion force of the air bag 64 which deforms a center part of the lid 45 to swell in the upward direction in a state where the lid 45 is connected to the front cowl top 49 and the rear cowl top 41. Providing the reinforcement plate 52 can prevent the lid 45 from being deformed and broken off. Therefore, it is possible to prevent the lid 45 from being broken off and scattered out.

Modification 7

As shown in FIG. 20B, an air bag device 70A according to Modification 7 is substantially the same as the air bag device 50A according to the fourth embodiment except for the shape of the guide plate 51A and the use of a reinforcement plate 52. The reinforcement plate 52 is the same as that used in Modification 6. This guide plate 51A is thicker than the guide plate 51 according to Modification 6. Therefore, it is possible to more reliably prevent a deformation at the opening of the retainer 61 as compared with the air bag device 60A of Modification 6.

Figure 21A:
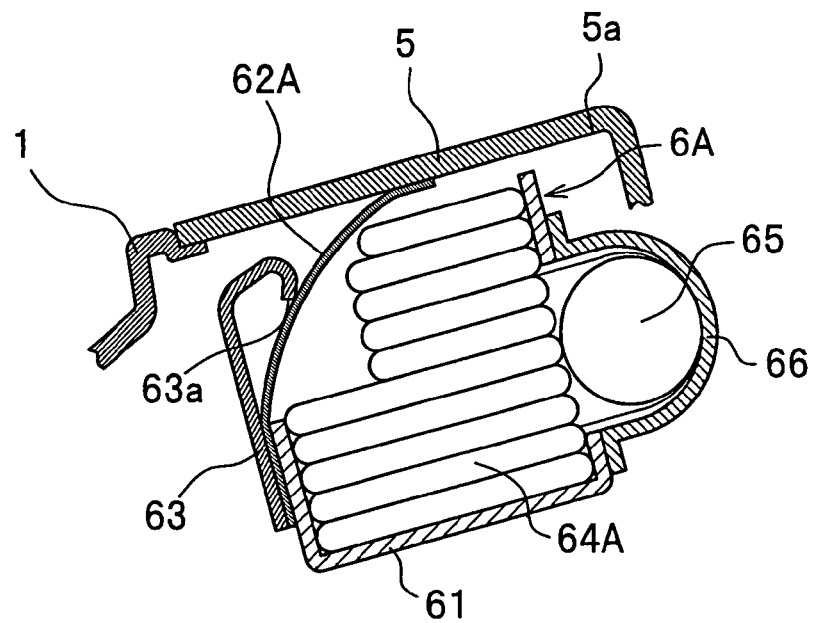
FIGS. 21A and 21B are sectional views illustrating Modification 8 and Modification 9 of the air bag device according to the third embodiment.
Figure 21B:
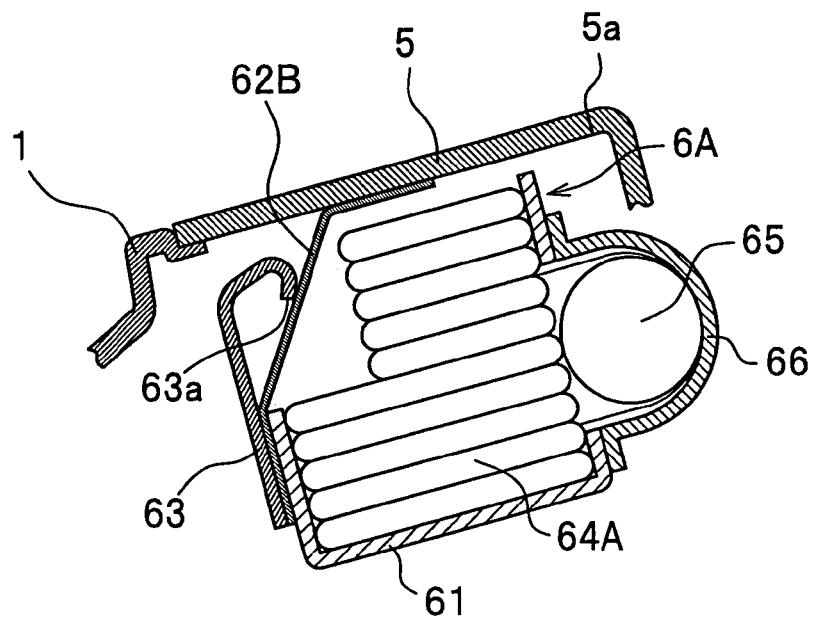

Next, with reference to FIGS. 21A and 21B, modifications of the hinge member 62 according to the third embodiment will be described. FIG. 21A shows Modification 8 and FIG. 21B shows Modification 9.

Modification 8

As shown in FIG. 21A, the air bag device 6A includes a hinge member 62A having U-shaped cross section. One end portion of the hinge member 62A is fixed to the retainer 61 at one side thereof and the other end portion of the hinge member 62A is fixed to the lid 5 at the other side thereof. A part of the hinge member 62A is positioned under the distal end 63a of the guide plate 63. Therefore, when the air bag 64A inflates, the hinge member 62A rotates for a predetermined rotation angle with the distal end 63a of the guide plate 63 being the fulcrum.

Modification 9

As shown in FIG. 21B, the air bag device 6A includes a hinge member 62B having a flat surface (straight line in cross section) at a part where the hinge member 62B contacts with the distal end 63a of the guide plate 63. One end portion of the hinge member 62B is fixed to the retainer 61 at one side thereof and the other end portion of the hinge member 62B is fixed to the lid 5 at the other side thereof. A part of the hinge member 62B is positioned under the distal end 63a of the guide plate 63. Therefore, when the air bag 64A inflates, the hinge member 62B rotates for a predetermined rotation angle with the distal end 63a of the guide plate 63 being the fulcrum.

Although the inflator cover 66 has been described above as a vault-shaped cover for accommodating therein the inflator(s) 65, the structure of the inflator cover 66 is not limited to this specific structure as long as the inflator(s) 65 can be arranged behind the retainer 61. A modification of the inflator mounting structure will be described as Modification 10.

Modification 10

Figure 22:
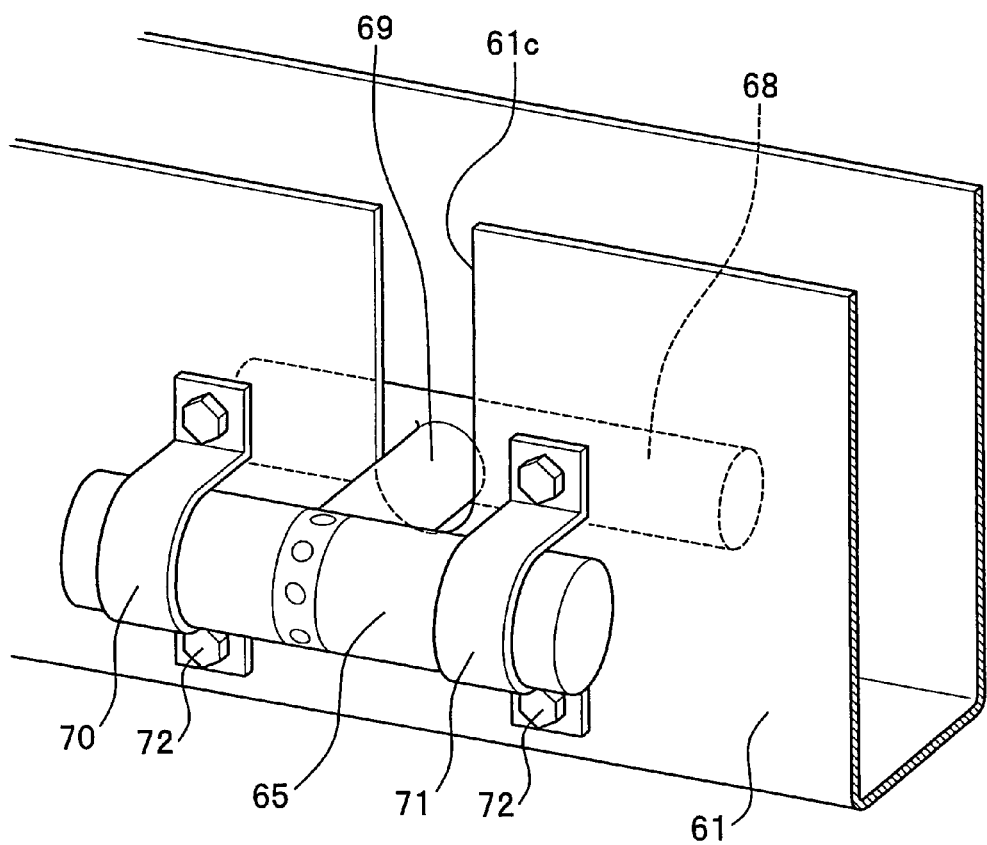
FIG. 22 is a perspective view illustrating Modification 10 of the inflator mounting structure according to the third and fourth embodiments.

As shown in FIG. 22, the inflator 65 is connected to a pipe member 68 through a connecting pipe member 69 to thereby form an H-shaped inflator unit as seen from the top. The connecting pipe member 69 has an outer diameter sized for fitting into a cutout 61c that is formed in the rear surface of the retainer 61. The H-shaped inflator unit is securely fixed to the retainer 61 with the connecting pipe member 69 slidably guided in the cutout 61c. The pipe member 68 and the connecting pipe member 69 are made from a hollow tubular pipe. To feed air (gas) into the air bag (not shown), the air bag is fixed to and sealed against the pipe member 68. Alternatively, the air bag may be fixed to and sealed against the inflator(s) 65. As seen in FIG. 22, the inflator 65 is secured to the rear surface of the retainer 61 by bands 71. The bands 71 are symmetrically positioned in the width direction of the vehicle relative to the axis extending along the connecting pipe member 69 and fixed to the retainer 61 by bolts 72 and nuts (not shown). According to this arrangement, although the retainer 61 allows less space for accommodating the air bag as compared with the arrangement of the third embodiment where the whole parts of the inflator(s) are housed in the space surrounded by the inflator cover 66, it is still possible to provide the same advantages as the air bag device 6A according to the third embodiment.

What is claimed is:

1. An air bag device comprising:
   a retainer having an opening;
   a lid for covering the opening of the retainer;
   an air bag accommodated in the retainer;
   at least one hinge member connecting the retainer and the lid; and
   at least one guide plate having a hook-shaped or J-shaped cross section to define a recess,
   wherein the hinge member is bent at its mid portion along the recess of the guide plate, wherein a distal end of the guide plate is disposed on a recessed side of the bent mid portion of the hinge, and wherein one end portion of the hinge member is fixed to a reverse surface of the lid at one side thereof and the other end portion of the hinge member is fixed to the guide plate and sandwiched between the guide plate and the retainer.

2. An air bag device according to claim 1, wherein one end portion of the guide plate extends to a lower portion of the retainer along and over the hinge member.

3. An air bag device according to claim 1 or 2, wherein a reinforcement plate is fixed to the reverse surface of the lid.

4. An air bag device according to claim 1 or 2, wherein an inflator is arranged behind the retainer.

5. An air bag device according to claim 3, wherein an inflator is arranged behind the retainer.

6. An air bag device according to claim 4, further comprising an inflator cover which defines a space in communication with an opening formed in a rear surface of the retainer and extending rearward of a vehicle on which the air bag device is mounted.

7. An air bag device according to claim 5, further comprising an inflator cover which defines a space in communication with an opening formed in a rear surface of the retainer and extending rearward of a vehicle on which the air bag device is mounted.

8. An air bag device according to claim 1, wherein the hook-shaped or J-shaped cross section of the guide plate is at the distal end of the guide plate.

9. An air bag device according to claim 8, wherein the hinge deforms around the distal end of the guide plate when the air bag is inflated.

10. An air bag device according to claim 1, wherein the guide plate is fixed to the retainer.

11. An air bag device according to claim 1, wherein the hinge deforms around the distal end of the guide plate when the air bag is inflated.

12. An air bag device according to claim 4, wherein the inflator is arranged behind the retainer in a direction substantially perpendicular to a deployment direction of the air bag.

13. An air bag device according to claim 6, wherein the inflator is arranged behind the retainer in a direction substantially perpendicular to a deployment direction of the air bag.

* * * * *